(12) United States Patent
Kawabe et al.

(10) Patent No.: US 8,912,740 B2
(45) Date of Patent: Dec. 16, 2014

(54) ACTUATOR DRIVER

(71) Applicant: Panasonic Corporation, Osaka (JP)

(72) Inventors: Akira Kawabe, Osaka (JP); Kouji Okamoto, Osaka (JP); Fumiaki Senoue, Osaka (JP); Hitoshi Kobayashi, Osaka (JP); Kiyotaka Tanimoto, Kanagawa (JP); Hideki Nishino, Osaka (JP); Shiro Sakiyama, Kyoto (JP); Takashi Morie, Osaka (JP); Akio Yokoyama, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/929,982

(22) Filed: Jun. 28, 2013

(65) Prior Publication Data

US 2013/0285579 A1  Oct. 31, 2013

Related U.S. Application Data

(63) Continuation of application No. PCT/JP2011/002858, filed on May 23, 2011.

(30) Foreign Application Priority Data

Dec. 28, 2010 (JP) ................................. 2010-293792

(51) Int. Cl.
| | |
|---|---|
| H02P 6/16 | (2006.01) |
| H02P 7/00 | (2006.01) |
| G11B 5/55 | (2006.01) |
| G11B 5/596 | (2006.01) |
| G11B 21/08 | (2006.01) |
| G11B 21/10 | (2006.01) |
| H02P 7/29 | (2006.01) |
| H02P 25/02 | (2006.01) |

(52) U.S. Cl.
CPC ................ H02P 7/00 (2013.01); G11B 5/5526 (2013.01); G11B 5/59622 (2013.01); G11B 21/083 (2013.01); G11B 21/106 (2013.01);
(Continued)

(58) Field of Classification Search
CPC ....... G05D 3/1472; G05D 3/14; G05B 1/027; G05B 11/013; G05B 19/291; H03J 1/187; H02P 6/085; H02P 7/0044; H02P 6/008; H02P 6/14; H02P 7/28; H02P 6/06; H02P 6/182; H02P 6/16; H02P 6/08; H02P 27/06; H02P 27/08; H03M 1/00; H03M 2201/128; H03M 2201/4125; H03M 2201/844; H03M 7/30; H03M 5/145; H03M 3/30; H03M 2201/4135; H03M 2201/4225; H03M 3/43; H03M 3/454; H03M 7/304; H03M 7/3028; H03M 2201/4233; H03M 2201/4262; H03M 1/66; H03M 3/356; H03M 2201/6121; H03M 3/458; H04N 7/30; H04N 7/50; H04L 1/0041; H02M 3/157; H02M 2001/0077; H02M 7/53873; H03F 3/2173; H03F 2200/331; H03F 3/217; H05B 41/3927
USPC .................. 318/400.04, 667, 400.07, 400.32, 318/400.26, 400.29, 254.2, 294, 535, 142, 318/155, 118, 144, 115, 77, 568.22, 400.3; 341/143, 142, 155, 118, 144, 115, 77
See application file for complete search history.

(56) References Cited

U.S. PATENT DOCUMENTS 6,449,569 B1 * 9/2002 Melanson ........................ 702/65
7,773,018 B2 * 8/2010 Chae et al. ..................... 341/143
(Continued)

FOREIGN PATENT DOCUMENTS

| JP | 11-353830 | 12/1999 |
|---|---|---|
| JP | 2005-304096 | 10/2005 |

(Continued)

OTHER PUBLICATIONS

International Search Report of PCT Application No. PCT/JP2011/002858 dated Aug. 16, 2011.

*Primary Examiner* — Kawing Chan
*Assistant Examiner* — Jorge L Carrasquillo
(74) *Attorney, Agent, or Firm* — McDermott Will & Emery LLP

(57) ABSTRACT

A actuator driver includes a digital filter configured to perform phase compensation of a digital torque command signal using a fed-back digital signal; a digital PWM generator configured to generate a plurality of pulse-width modulated PWM control signals in response to an output of the digital filter; at least one H bridge configured to select and output a first or second terminal voltage in response to the plurality of PWM control signals; first and second continuous time ΔΣ A/D converters configured to convert the first and second terminal voltages from analog to digital, respectively; and a feed-back filter configured to decimate outputs of the first and second continuous time ΔΣ A/D converters to feed back the digital signal to the digital filter.

17 Claims, 22 Drawing Sheets

(52) U.S. Cl.
CPC .............. *H02P 7/0044* (2013.01); *H02P 7/29* (2013.01); *H02P 25/028* (2013.01)
USPC . 318/400.04; 318/601; 318/569; 318/400.23; 341/143; 341/126; 341/155

(56) References Cited

U.S. PATENT DOCUMENTS

| | | |
|---|---|---|
| 2007/0035896 A1 | 2/2007 | Kobayashi et al. |
| 2008/0238390 A1 | 10/2008 | Trivedi et al. |
| 2009/0154691 A1* | 6/2009 | Gaggl et al. ............ 379/395.01 |

FOREIGN PATENT DOCUMENTS

| | | | |
|---|---|---|---|
| JP | 2005-304096 A | | 10/2005 |
| JP | 2005304096 A | * | 10/2005 |
| JP | 2008-099350 | | 4/2008 |
| JP | 2008-099350 A | | 4/2008 |
| JP | 2008099350 A | * | 4/2008 |
| JP | 2009-260605 | | 11/2009 |
| JP | 2009-260605 A | | 11/2009 |

* cited by examiner

ACTUATOR DRIVER

CROSS-REFERENCE TO RELATED APPLICATIONS

This is a continuation of International Application No. PCT/JP2011/002858 filed on May 23, 2011, which claims priority to Japanese Patent Application No. 2010-293792 filed on Dec. 28, 2010. The entire disclosures of these applications are incorporated by reference herein.

BACKGROUND

The present disclosure relates to actuator drivers, and more particularly to fully digitally controlled actuator drivers.

Actuator drivers are widely used in various products. For example, in optical disk devices, an actuator driver is used for controlling the tilt direction, the tracking direction, and the focus direction of an optical pick-up device, controlling a sled motor which shifts the optical pick-up device in the disk radial direction, controlling a loading motor for taking an optical disk in and out, and controlling a spindle motor for rotary driving an optical disk.

In general, actuator drivers detect a current flowing through a load using a sense resistor, and feed back a detection signal to perform phase compensation of a torque command signal, thereby PWM-driving the load. Almost all phase compensation filters and PWM signal generators have been analog circuits. Thus, in actuator drivers, which are used for driving an optical pick-up device etc. and requiring extremely high accuracy, a sufficient design margin and a sufficient layout size have been needed to absorb process variations and temperature variations. Furthermore, a compensation circuit has been required. Since the signal bandwidth is low, there is a need to increase the element constant of a phase compensation filter. An external resistive element and an external capacitive element are needed. Therefore, the area and power consumption are difficult to reduce.

As digitalization of recent control of optical disks progresses, torque command signals output from controllers are also being digitalized. However, since actuator drivers are in analog form, the digital torque command signals need to be converted to analog signals using a D/A converter. As described above, optical disk devices control various control targets, and a plurality of torque command signals are present. Accordingly, the same number of D/A converters are required. In the actuators requiring the accuracy of 10 bits or more, D/A converters need considerable large power consumption. The circuit scale and power consumption are assumed to further increase in the future.

Full digitalization of actuator drivers is suggested to address the drawback of the analog form. For example, a fully digitally controlled actuator driver detects a current flowing through a load using a sense resistor, converts a detection signal from analog to digital, and feeds back the converted detection signal to perform phase compensation of a torque command signal in the digital region, thereby PWM-driving the load.

In a conventional fully digitally controlled actuator driver, thermal noise generated in a sense resistor may deteriorate the control accuracy. Therefore, there is a need for a fully digitally controlled actuator driver, which performs highly accurate operation without using any sense resistor.

SUMMARY

According to one aspect of the present disclosure, an actuator driver selects and outputs at least one first or second terminal voltage in response to at least one input digital torque command signal to drive an actuator. The actuator driver includes a digital filter configured to perform phase compensation of the digital torque command signal using a fed-back digital signal; a digital PWM generator configured to generate a plurality of pulse-width modulated PWM control signals in response to an output of the digital filter; at least one H bridge configured to select and output the first or second terminal voltage in response to the plurality of PWM control signals; first and second continuous time $\Delta\Sigma$ A/D converters configured to convert the first and second terminal voltages from analog to digital, respectively; and a feed-back filter configured to decimate outputs of the first and second continuous time $\Delta\Sigma$ A/D converters to feed back the digital signal to the digital filter.

With this configuration, the first and second terminal voltages output from the H bridge are individually converted from analog to digital with high accuracy, and the difference voltage is fed back to the digital filter, thereby extremely accurately driving the actuator.

For example, the feed-back filter may include first and second decimation filters configured to filter the outputs of the first and second continuous time $\Delta\Sigma$ A/D converters, respectively, and a differential/single converter configured to calculate a difference between outputs of the first and second decimation filters, and feed back a digital signal indicating the difference to the digital filter. Alternatively, the feed-back filter may include a differential/single converter configured to output a difference between the outputs of the first and second continuous time $\Delta\Sigma$ A/D converters, and a decimation filter configured to filter an output of the differential/single converter.

DETAILED DESCRIPTION

First Embodiment

Figure 1:
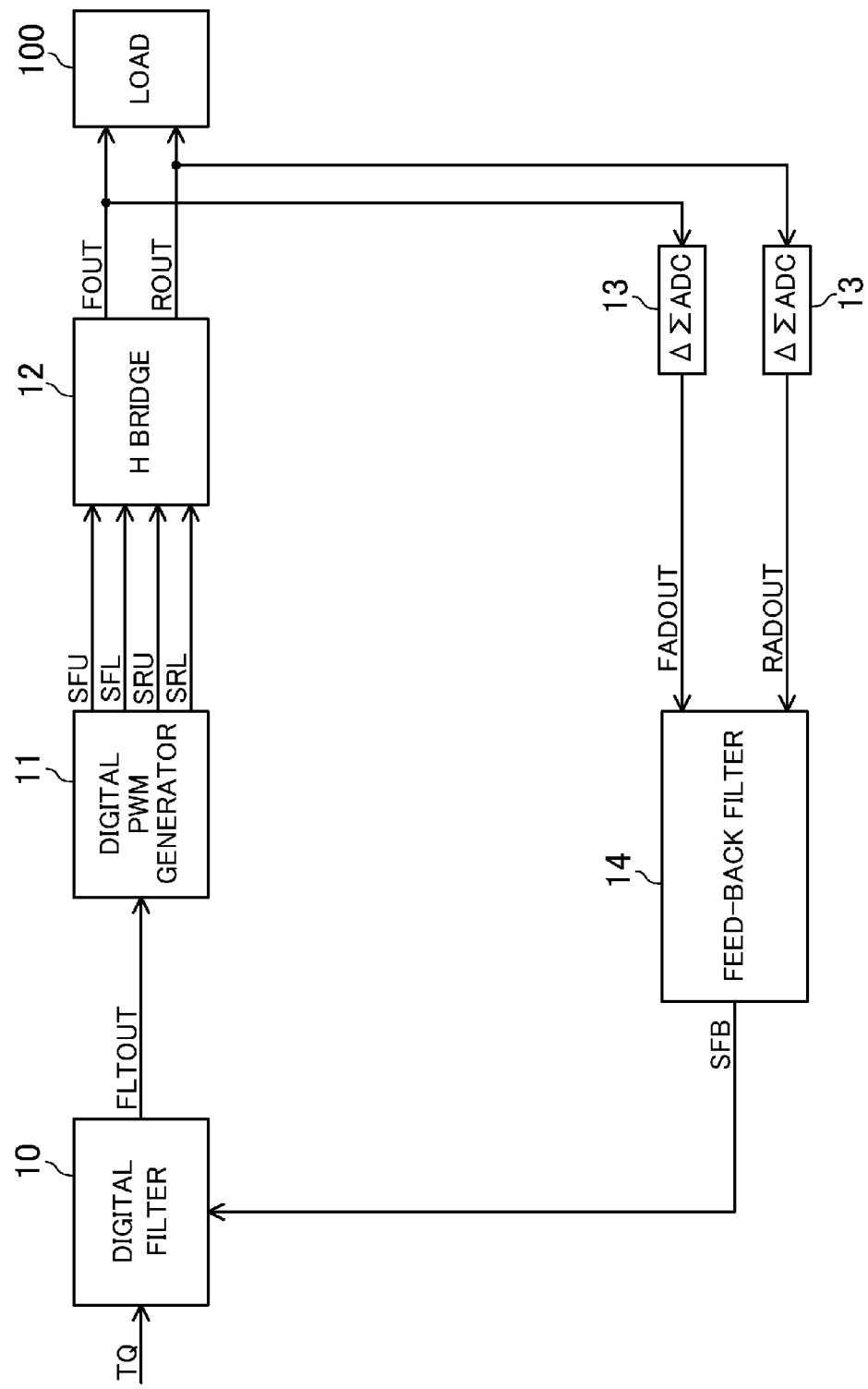
FIG. 1 is a configuration diagram of an actuator driver according to a first embodiment.

FIG. 1 illustrates the configuration of an actuator driver according to a first embodiment. A load 100 driven by the actuator driver according to this embodiment is, for example, a voice coil motor etc., which is part of an actuator (not shown). When an F terminal voltage FOUT is applied to the load 100, a forward current flows through the load 100, and the actuator moves in a forward direction. On the other hand, when an R terminal voltage ROUT is applied to the load 100, a reverse current flows through the load 100, and the actuator moves in a reverse direction. Depending on the amount of the current supplied to the load 100, torque generated in the actuator varies. That is, greater torque is generated by the actuator, when a great amount of current is applied to the load 100.

The actuator driver according this embodiment selects one of outputs FOUT and ROUT, and performs PWM control of the selected one in response to a digital torque command signal TQ input from an external controller (not shown). Specifically, the actuator driver selects FOUT or ROUT to switch the direction of the current applied to the load 100, and controls the pulse widths of FOUT and ROUT to control the amount of the current supplied to the load 100.

Specifically, the actuator driver includes a digital filter 10, a digital PWM generator 11, an H bridge 12, two continuous time $\Delta\Sigma$ A/D converters 13, and a feed-back filter 14. These elements can be digital circuits, except for the H bridge 12 and the two continuous time $\Delta\Sigma$ A/D converters 13, which are interfaces with the load 100. These elements will be described below in detail.

Figure 2:
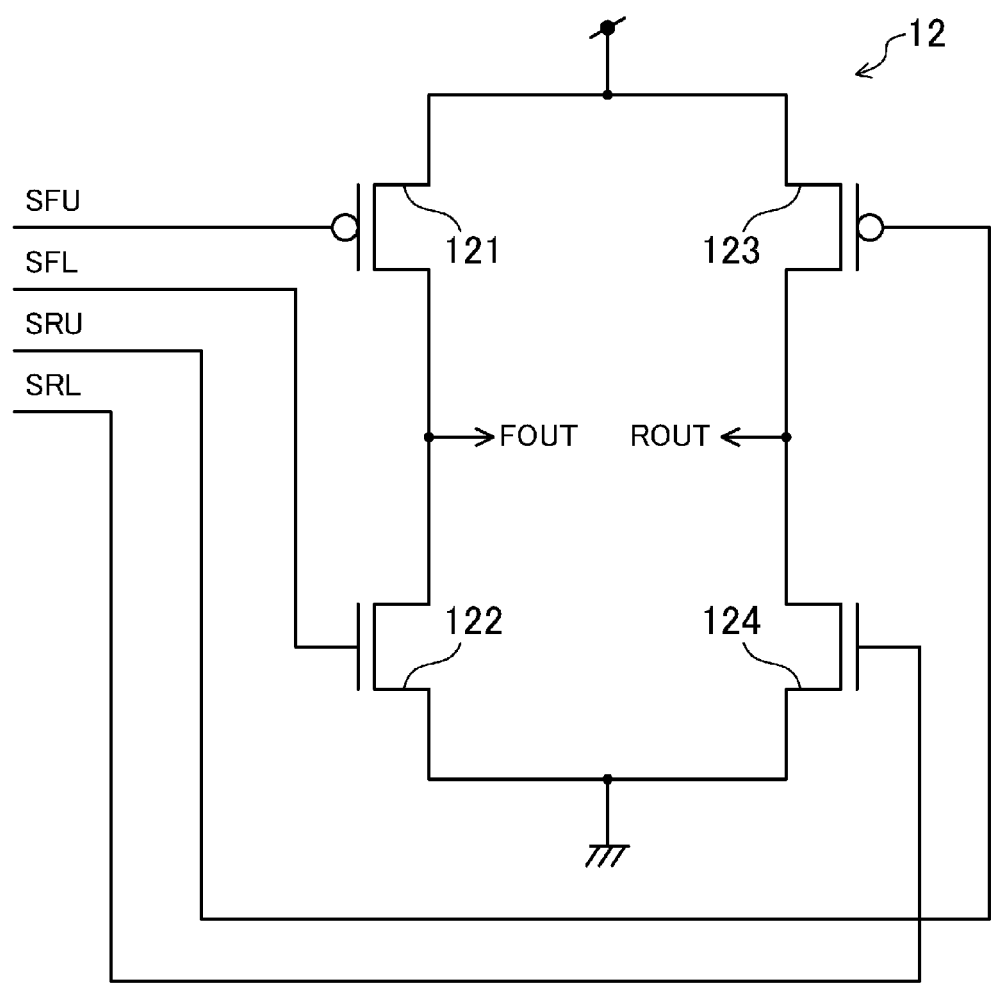
FIG. 2 is a configuration diagram of an H bridge according to an example.

The H bridge 12 is controlled with four PWM control signals SFU, SFL, SRU and SRL, and outputs FOUT or ROUT. FIG. 2 illustrates an example configuration of the H bridge 12. The H bridge 12 includes, for example, a PMOS transistor 121 as an upper F-side switch, an NMOS transistor 122 as a lower F-side switch, a PMOS transistor 123 as an upper R-side switch, and an NMOS transistor 124 as a lower R-side switch. The sources of the PMOS transistors 121 and 123 are connected to a power source node, and the sources of the NMOS transistors 122 and 124 are connected to a ground node. The drain of the PMOS transistor 121 is connected to the drain of the NMOS transistor 122, and FOUT is output from the connecting point. The drain of the PMOS transistor 123 is connected to the drain of the NMOS transistor 124, and ROUT is output from the connecting point.

SFU controls the switching of the PMOS transistor 121. SFL controls the switching of the NMOS transistor 122. SRU controls the switching of the PMOS transistor 123. SRL controls the switching of the NMOS transistor 124. FOUT is output, when SFU and SRL are shifted to an L level and an H level to turn on the PMOS transistor 121 and the NMOS transistor 124, respectively, and SRU and SFL are shifted to an H level and an L level to turn off the PMOS transistor 123 and the NMOS transistor 122, respectively. On the other hand, ROUT is output, when SRU and SFL are shifted to an L level and an H level to turn on the PMOS transistor 123 and the NMOS transistor 122, respectively, and SFU and SRL are shifted to an H level and an L level to turn off the PMOS transistor 121 and the NMOS transistor 124, respectively.

Referring back to FIG. 1, the digital filter 10 performs phase compensation of TQ using a digital signal SFB fed back from the feed-back filter 14, and outputs the digital signal FLTOUT. TQ is a digital signal designating the moving direction of the actuator and the torque. For example, the positive and negative signs of TQ represent the moving direction of the actuator, and the absolute value of TQ represents the magnitude of the torque. The transfer function of the digital filter 10 corresponds to the bilinearly transformed transfer function of an analog filter used for phase compensation in an analog actuator driver. Specifically, the digital filter 10 performs PI control or PID control of a difference value between TQ and SFB to generate FLTOUT. TQ, SFB and FLTOUT may have any signal bit width, and may have different bit widths.

The digital PWM generator 11 outputs SFU, SFL, SRU, and SRL in response to FLTOUT. The positive or negative polarity of FLTOUT uniquely determines whether FOUT or ROUT is to be output. The absolute value of FLTOUT uniquely determines the output pulse width of FOUT or ROUT. Therefore, the digital PWM generator 11 determines which of SFU, SFL, SRU, and SRL should be controlled based on the positive or negative polarity of FLTOUT in each PWM period. The digital PWM generator 11 further determines the timing of edge generation of the signal to be controlled based on the absolute value of FLTOUT. For example, the digital PWM generator 11 counts the time corresponding to the absolute value of FLTOUT using a counter (not shown), which operates with a sufficiently faster clock signal than the PWM frequency, to determine the timing of edge generation of the signal to be controlled.

Some preferable configurations of the digital PWM generator 11 will be suggested below.

First Example Configuration of Digital PWM Generator 11

Figure 3:
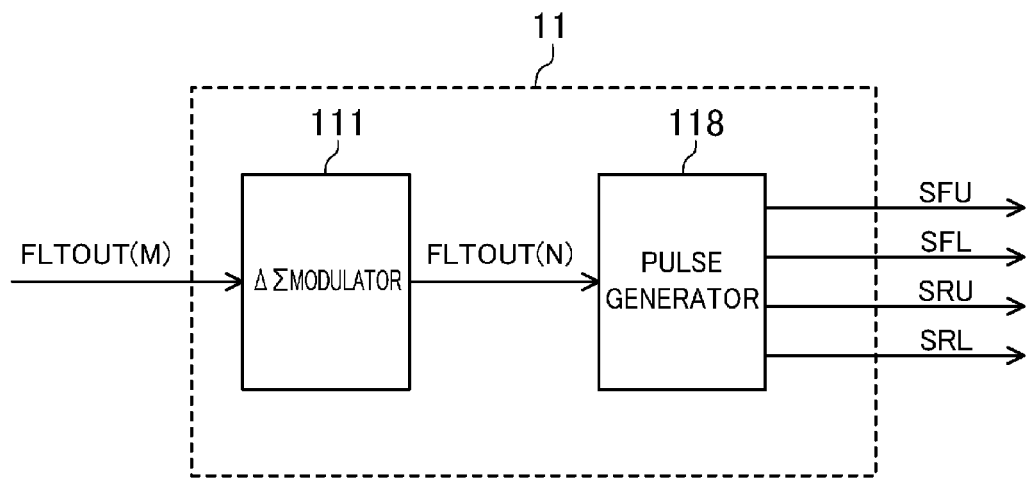
FIG. 3 is a configuration diagram of a digital PWM generator according to a first example.

FIG. 3 illustrates the configuration of a digital PWM generator 11 according to a first example. The digital PWM generator 11 according to this example includes a $\Delta\Sigma$ modulator 111 and a pulse generator 118.

The $\Delta\Sigma$ modulator 111 $\Delta\Sigma$ modulates of an input FLTOUT with an M-bit width and rounds the lower bits to generate FLTOUT of N bits.

The pulse generator 118 outputs SFU, SFL, SRU, and SRL in response to FLTOUT with the N-bit width. Specifically, the pulse generator 118 determines which of SFU, SFL, SRU, and SRL should be controlled based on the positive or negative polarity of FLTOUT with the N-bit width in each PWM period. The pulse generator 118 further determines the timing of edge generation of the signal to be controlled by counting the time corresponding to the absolute value of FLTOUT with the N-bit width using a counter (not shown), which operates with a sufficiently fast clock signal in accordance with the PWM frequency.

If there is no ΔΣ modulator 111, the pulse generator 118 needs to operate with a high-speed operating clock signal to provide PWM resolution of about M bits, thereby increasing the power consumption. By contrast, as in this example, the ΔΣ modulator 111 rounds the bit width of FLTOUT to N bits at the input stage of the digital PWM generator 11 so that the pulse generator 118 merely provides PWM resolution of about N bits. This reduces the frequency of the operating clock signal, thereby reducing the power consumption. In addition, the ΔΣ modulator 111 does not simply round down the lower bits of FLTOUT with the M-bit width, but rounds the bit width to N bits by ΔΣ modulation. On average in the time direction, the pulse generator 118 substantially provides PWM resolution of about M bits.

As such, the digital PWM generator 11 according to this example reduces the power consumption and performs high-resolution PWM control.

Second Example Configuration of Digital PWM Generator 11

Figure 4:
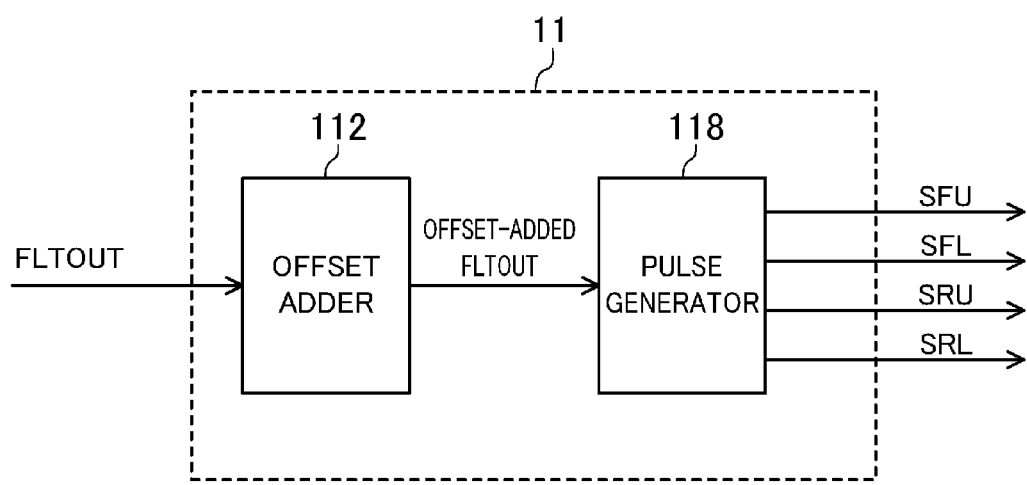
FIG. 4 is a configuration diagram of a digital PWM generator according to a second example.

FIG. 4 illustrates the configuration of a digital PWM generator 11 according to a second example. The digital PWM generator 11 according to this example includes an offset adder 112 and a pulse generator 118.

When input FLTOUT has a value close to zero, the offset adder 112 adds a positive or negative offset to FLTOUT so that the time average becomes zero. For example, when the absolute value of the input FLTOUT is smaller than the threshold close to zero, the offset adder 112 inverts the positive or negative sign of the offset and adds the inverted value to FLTOUT in each PWM period.

The reason for adding the offset to FLTOUT is as follows. Where FLTOUT has a value close to zero, a current following to an inductor component contained in the load 100 is almost zero. In this state, when the load 100 suddenly receives a high-torque command, a current does not flow to the load 100 soon, thereby deteriorating the response characteristics. Thus, where FLTOUT has a value close to zero, the offset is daringly added to FLTOUT so that a current always flows through the load 100. This improves the response characteristics.

The pulse generator 118 outputs SFU, SFL, SRU, and SRL in response to offset-added FLTOUT. Specifically, the pulse generator 118 determines which of SFU, SFL, SRU, and SRL should be controlled based on the positive or negative polarity of the offset-added FLTOUT in each PWM period. The pulse generator 118 further determines the timing of edge generation of the signal to be controlled by counting the time corresponding to the absolute value of offset-added FLTOUT, using a counter (not shown), which operates with a sufficiently fast clock signal in accordance with the PWM frequency.

Figure 5:
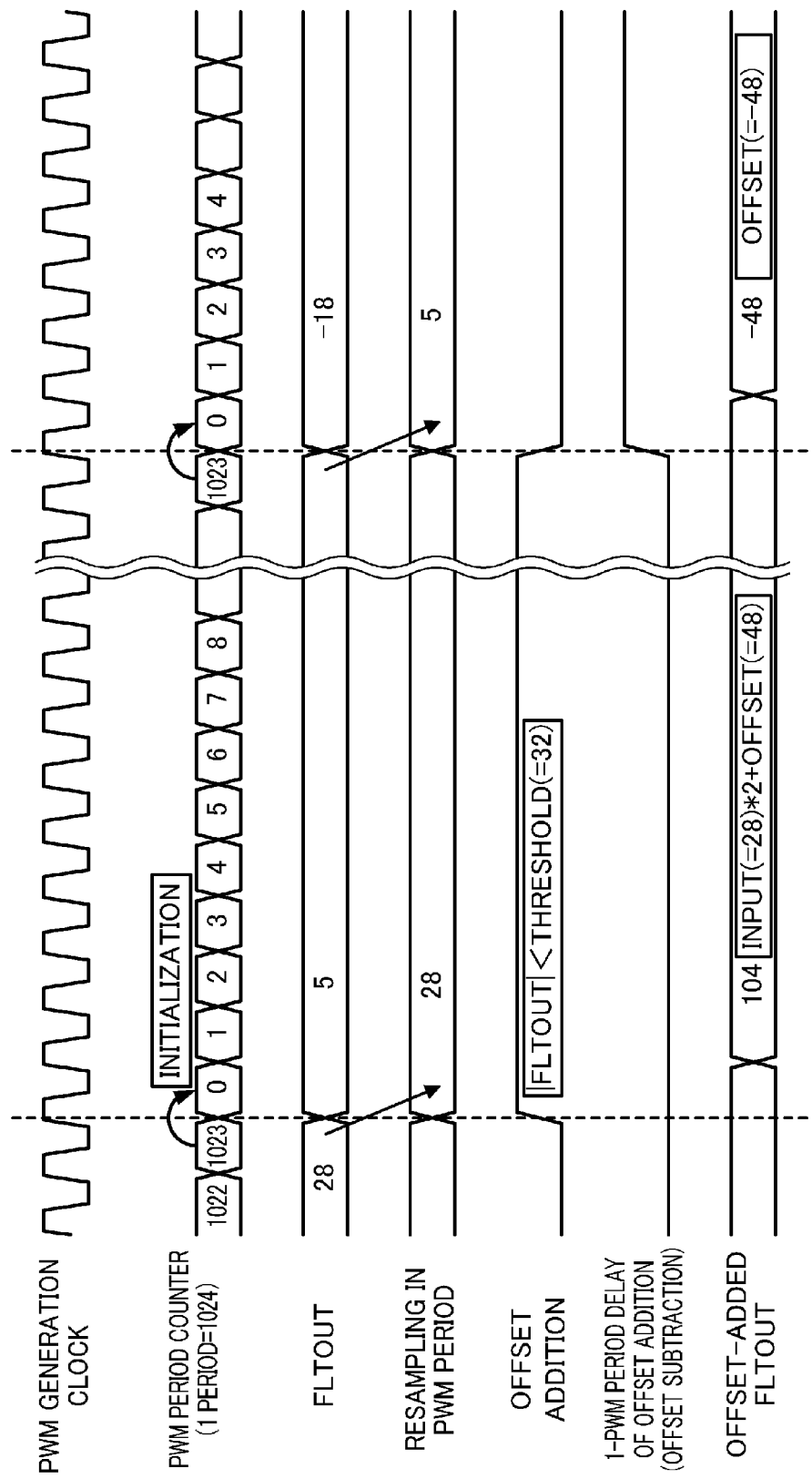
FIG. 5 is a timing chart of the digital PWM generator according to the second example.

Operation of the digital PWM generator 11 according to this example will be described with reference to the timing chart of FIG. 5. For example, the digital PWM generator 11 divides the PWM period into "1024" using a PWM period counter operating in synchronization with a PWM generation clock to provide PWM resolution of about 10 bits. The offset adder 112 resamples the input FLTOUT at the beginning of the next PWM period. For example, assume that the value "28" is input as FLTOUT, and this value is resampled in a PWM period. In this case, since the absolute value of "28" is smaller than the threshold "32," a flag indicating offset addition is set. When the flag indicating offset addition is set, the offset adder 112 doubles the resampled value "28" of FLTOUT, adds the offset "48" to the doubled value, and outputs the sum "104" as the offset-added FLTOUT.

In the next PWM period, a flag indicating offset subtraction is set. The flag indicating offset subtraction is obtained by delaying the flag indicating offset addition by one PWM period. When the flag indicating offset subtraction is set, the offset adder 112 outputs the value obtained by subtracting the offset "48" from "0," i.e., "−48," as the offset-added FLTOUT. The base value of the offset addition is here "0," because the value of FLTOUT, which has been resampled in the previous PWM period, is doubled and output so that there is no need to output the resampled value of FLTOUT in this PWM period.

Figure 6:
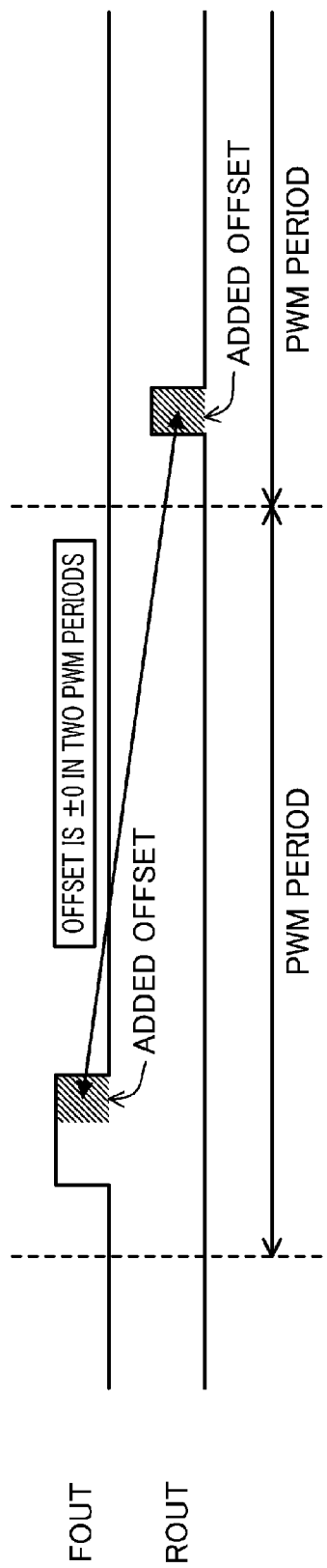
FIG. 6 is a timing chart of outputs of an H bridge corresponding to FIG. 5.

As such, where FLTOUT having a value "28" is input, the offset adder 112 outputs the value "104" as the offset-added FLTOUT, and outputs the value "−48" in the next PWM period. The PWM period average of the offset-added FLTOUT, which is output from the offset adder 112 for the two PWM periods, is "28," which is obtained by the expression (104−48)/2, and equal to the value of the input FLTOUT. That is, as shown in FIG. 6, the pulse width of FOUT increases by the added value in the offset addition. However, the added offset to FOUT is canceled by outputting ROUT with a pulse width corresponding to the added value in the next PWM period.

As described above, even when the value of FLTOUT is close to zero, the digital PWM generator 11 according to this example always allows a current to flow to the load 100 and drives the load 100 in accordance with the value. This improves the response characteristics of the actuator driver when the value of FLTOUT is close to zero.

The above-described threshold and offset are mere examples, and may be any value. The means of the offset addition is also not limited thereto.

Third Example Configuration of Digital PWM Generator 11

Figure 7:
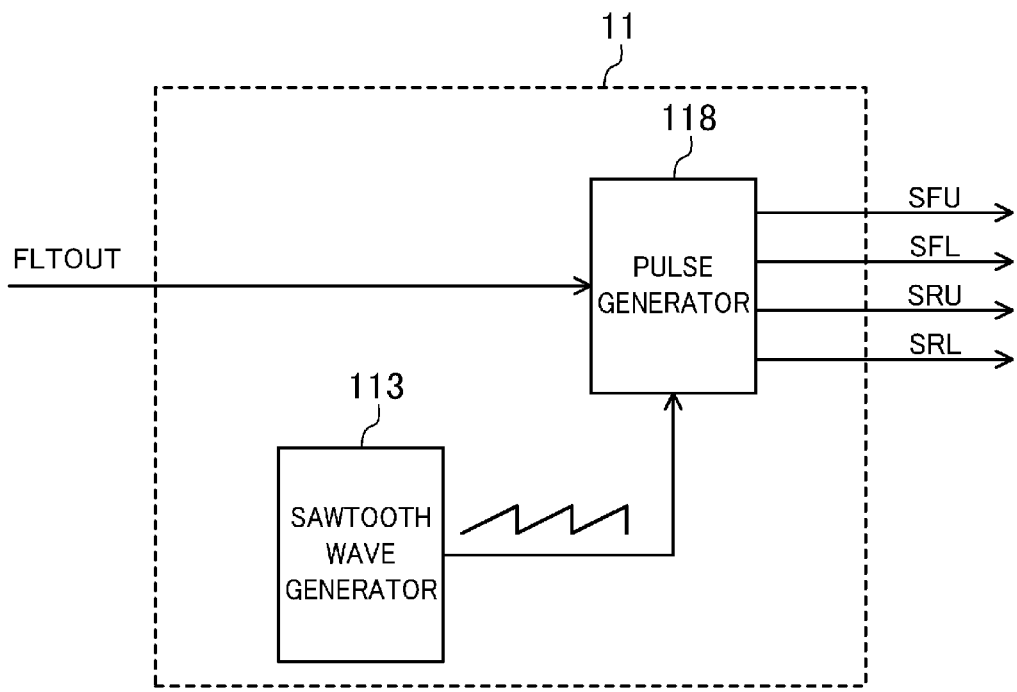
FIG. 7 is a configuration diagram of a digital PWM generator according to a third example.

FIG. 7 illustrates the configuration of a digital PWM generator 11 according to a third example. The digital PWM generator 11 according to this example includes a sawtooth wave generator 113 and a pulse generator 118.

The sawtooth wave generator 113 outputs a digital signal representing a value monotonically increasing or decreasing from the initial value in each PWM period. The sawtooth wave generator 113 may be, for example, an up counter or a down counter, which is reset in each PWM period.

The pulse generator 118 outputs SFU, SFL, SRU, and SRL in response to FLTOUT. Specifically, the pulse generator 118 determines which of SFU, SFL, SRU, and SRL should be controlled based on the positive or negative polarity of FLTOUT in each PWM period. The pulse generator 118 further determines the timing of edge generation of the signal to be controlled by comparing the absolute value of FLTOUT and the output value of the sawtooth wave generator 113. For example, while the absolute value of FLTOUT is smaller than the output value of the sawtooth wave generator 113, the pulse generator 118 fixes the signal to be controlled to a predetermined logic level such as an H level.

As such, the digital PWM generator 11 according to this example generates the pulses of SFU, SFL, SRU, and SRL at the beginning of a PWM period, thereby increasing the speed of the actuator driver in responding to a change in TQ.

Fourth Example Configuration of Digital PWM Generator 11

Figure 8:
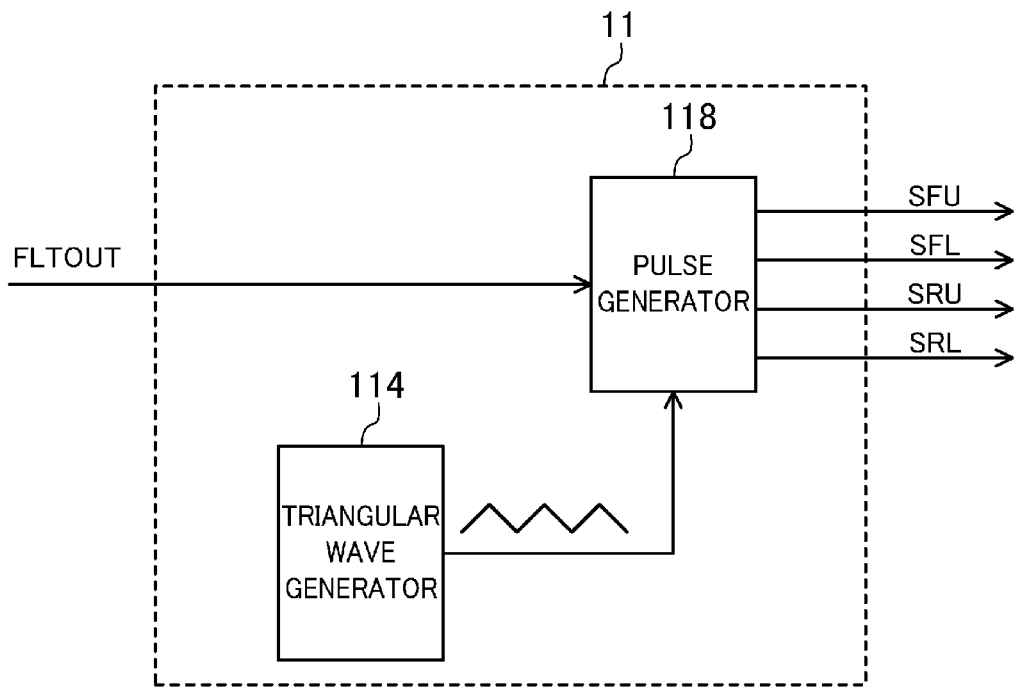
FIG. 8 is a configuration diagram of a digital PWM generator according to a fourth example.

FIG. 8 illustrates the configuration of a digital PWM generator 11 according to a fourth example. The digital PWM generator 11 according to this example includes a triangular wave generator 114 and a pulse generator 118.

The triangular wave generator 114 outputs a digital signal representing a value monotonously increasing and decreasing between the lower limit and the upper limit in each PWM period. The triangular wave generator 114 may be, for example, an up/down counter which is reset in each PWM period.

The pulse generator 118 outputs SFU, SFL, SRU, and SRL in response to FLTOUT. Specifically, the pulse generator 118 determines which of SFU, SFL, SRU, and SRL should be controlled based on the positive or negative polarity of FLTOUT in each PWM period. The pulse generator 118 further determines the timing of edge generation of the signal to be controlled by comparing the absolute value of FLTOUT and the output value of the triangular wave generator 114. For example, while the absolute value of FLTOUT is smaller than the output value of the triangular wave generator 114, the pulse generator 118 fixes the signal to be controlled to a predetermined logic level such as an H level.

As such, the digital PWM generator 11 according to this example generates the pulses of SFU, SFL, SRU, and SRL in the middle of the PWM period, thereby increasing the smoothness of the actuator driver in responding to a change in TQ.

Fifth Example Configuration of Digital PWM Generator 11

Figure 9:
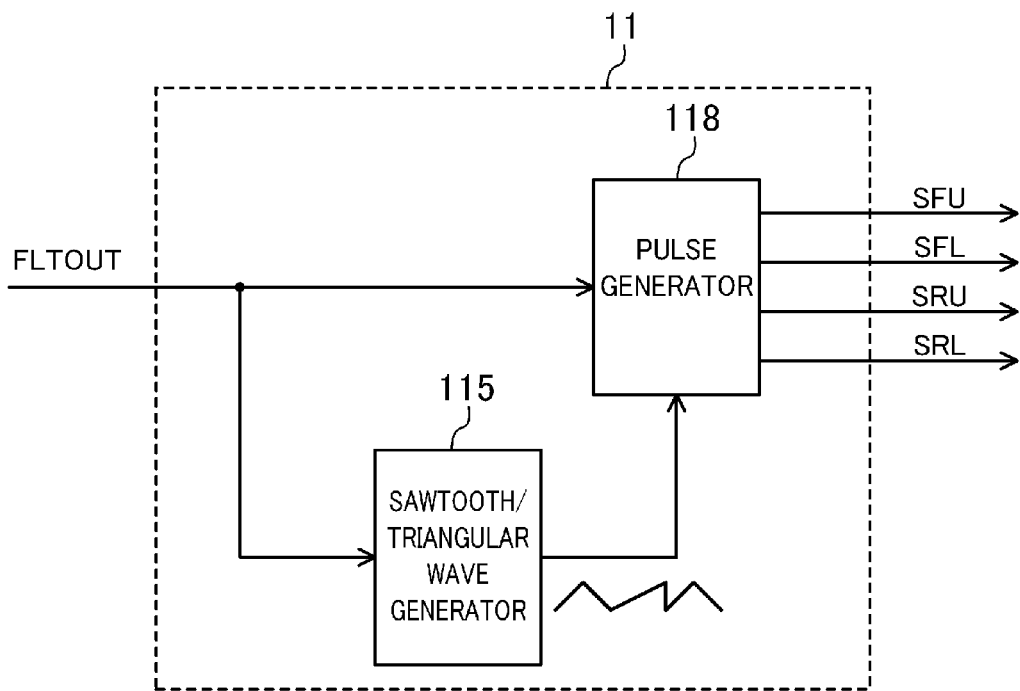
FIG. 9 is a configuration diagram of a digital PWM generator according to a fifth example.

FIG. 9 illustrates the configuration of a digital PWM generator 11 according to a fifth example. The digital PWM generator 11 according to this example includes a sawtooth/triangular wave generator 115 and a pulse generator 118.

The sawtooth/triangular wave generator 115 outputs a digital signal representing a value monotonically increasing or decreasing from the initial value in each PWM period, or a digital signal representing a value monotonously increasing and decreasing between the lower limit and the upper limit in each PWM period. The sawtooth/triangular wave generator 115 determines which waveform of digital signal is to be output in accordance with the magnitude of the absolute value of the input FLTOUT. The sawtooth/triangular wave generator 115 may be, for example, a combination of an up counter and a down counter, which are reset in each PWM period.

The pulse generator 118 outputs SFU, SFL, SRU, and SRL in response to FLTOUT. Specifically, the pulse generator 118 determines which of SFU, SFL, SRU, and SRL should be controlled based on the positive or negative polarity of FLTOUT in each PWM period. The pulse generator 118 further determines the timing of edge generation of the signal to be controlled by comparing the absolute value of FLTOUT and the output value of the sawtooth/triangular wave generator 115. For example, while the absolute value of FLTOUT is smaller than the output value of sawtooth/triangular wave generator 115, the pulse generator 118 fixes the signal to be controlled to a predetermined logic level such as an H level.

As such, the digital PWM generator 11 according to this example generates the pulses of SFU, SFL, SRU, and SRL in accordance with the magnitude of the absolute value of FLTOUT at the beginning of or in the middle of the PWM period, thereby increasing the speed and the smoothness of the actuator driver in responding to a change in TQ.

Sixth Example Configuration of Digital PWM Generator 11

Figure 10:
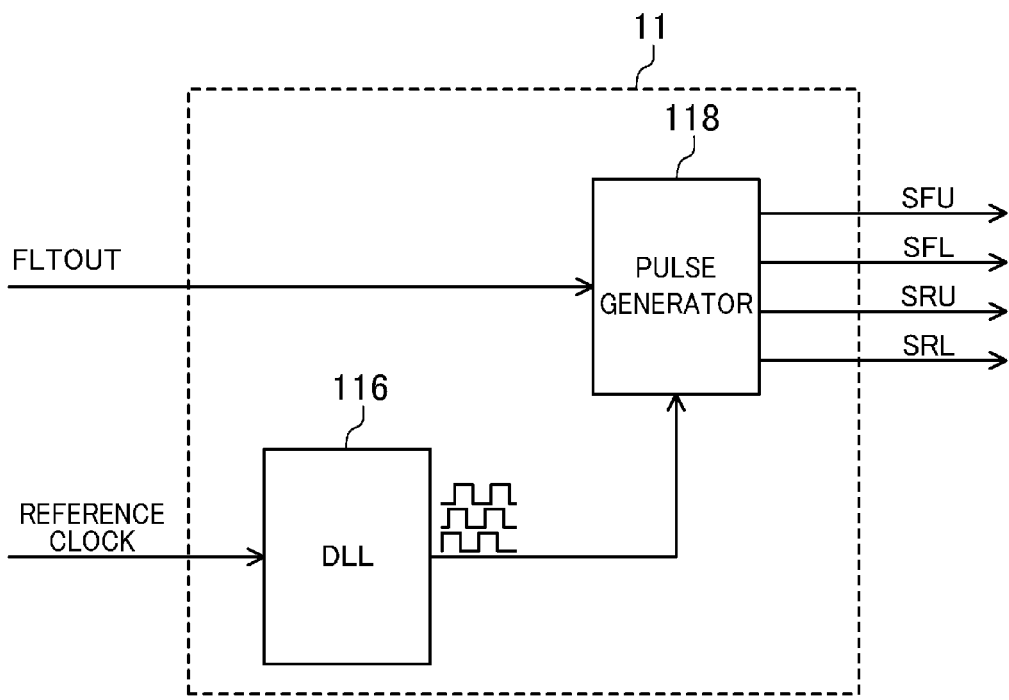
FIG. 10 is a configuration diagram of a digital PWM generator according to a sixth example.

FIG. 10 illustrates the configuration of a digital PWM generator 11 according to a sixth example. The digital PWM generator 11 according to this example includes a delay locked loop (DLL) 116 and a pulse generator 118.

The DLL 116 shifts the phase of an input reference clock signal to generate multi-phase clock signals having different phases. The PWM resolution of the digital PWM generator 11 according to this example depends on the minimum phase difference among the multi-phase clock signals. Thus, the minimum phase difference among the multi-phase clock signals is sufficiently smaller than the PWM period. As long as the reference clock signal is in synchronization with the PWM period, the frequency of the reference clock signal may be lower than the PWM frequency.

The pulse generator 118 outputs SFU, SFL, SRU, and SRL in response to FLTOUT. Specifically, the pulse generator 118 performs logical operation of two of the multi-phase clock signals output from the DLL 116, which are uniquely determined by the positive or negative polarity and the absolute value of FLTOUT, and outputs SFU, SFL, SRU, and SRL in each PWM period.

Figure 11:
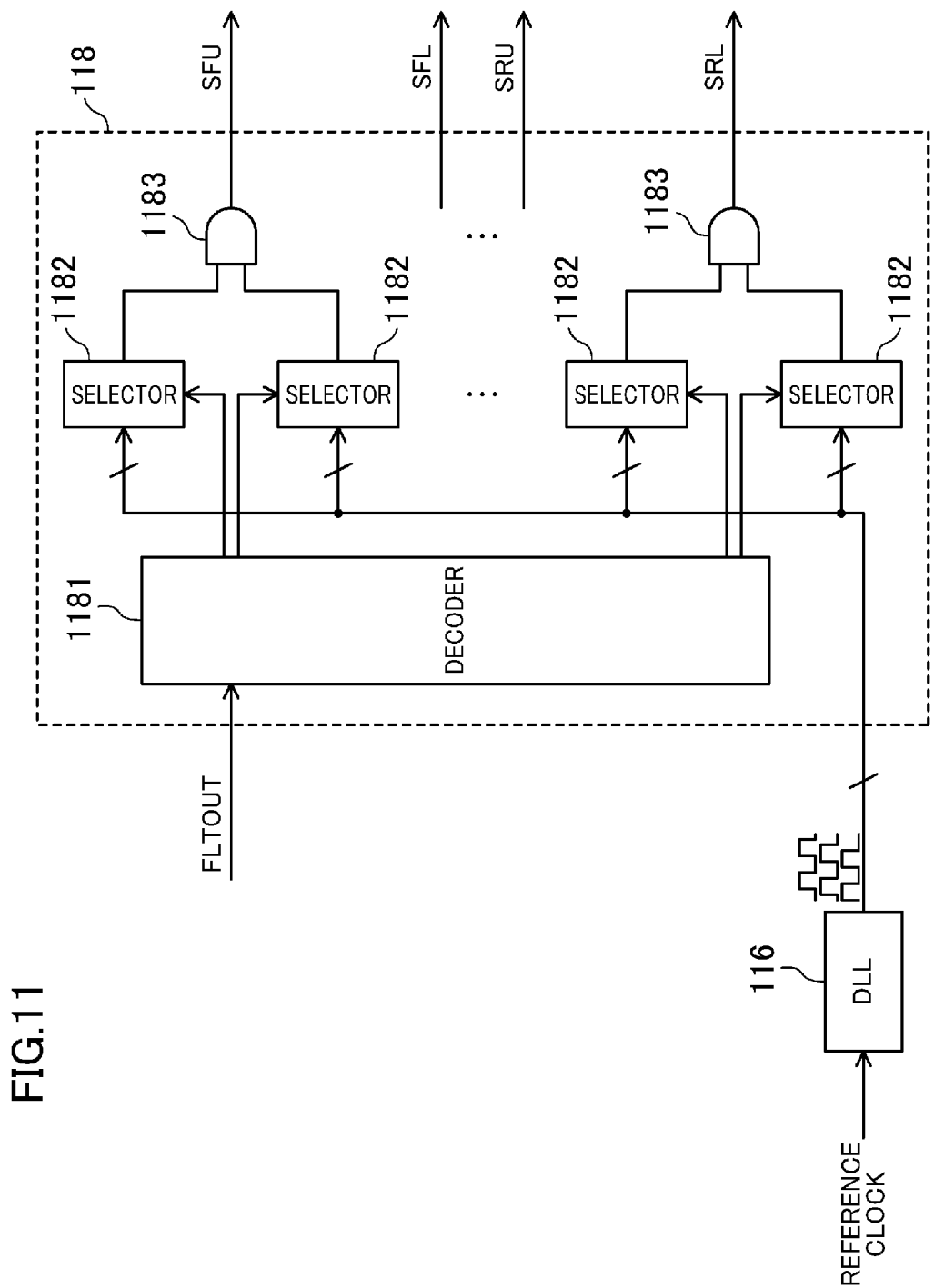
FIG. 11 is a configuration diagram of a pulse generator in the digital PWM generator according to the sixth example.

FIG. 11 illustrates an example configuration of the pulse generator 118 in the digital PWM generator 11 according to this example. The pulse generator 118 includes a decoder 1181, eight selectors 1182, and four AND gates 1183. The decoder 1181 decodes FLTOUT, and outputs a control signal for controlling each of the eight selectors 1182. Each of the selectors 1182 selects one of the multi-phase clock signals in response to the control signal input from the decoder 1181, and outputs the selected one. The AND gates 1183 perform AND operation of the clock signals output from two of the selectors 1182. Outputs of the four AND gates 1183 correspond to SFU, SFL, SRU, and SRL, respectively.

Figure 12:
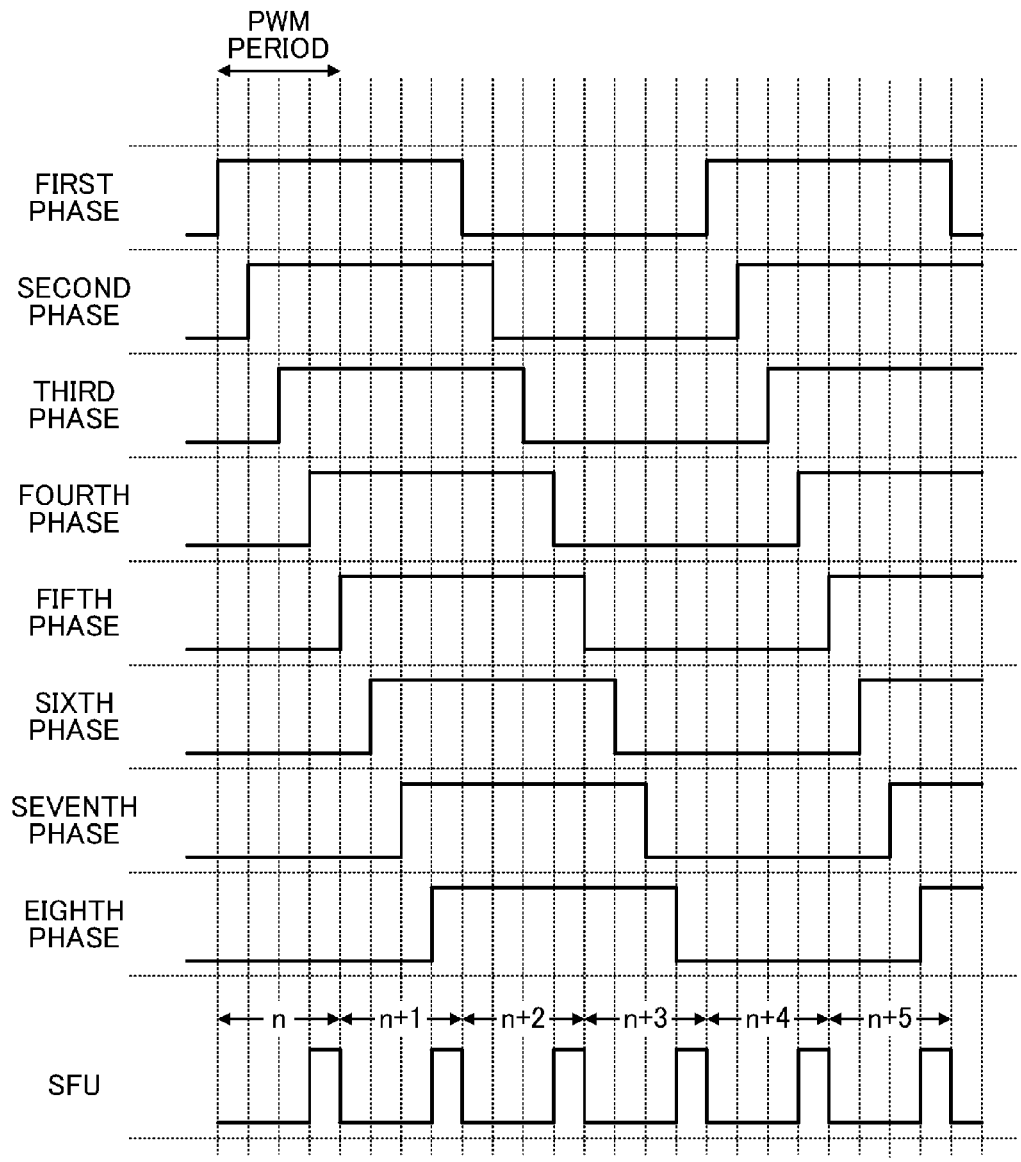
FIG. 12 is a timing chart of example pulse generation of SFU using the pulse generator of FIG. 11.

Example pulse generation of SFU using the pulse generator 118 will be described with reference to the timing chart of FIG. 12. Assume that the DLL 116 generates eight phase clock signals having a minimum phase difference of a ¼ PWM period from a reference clock signal of a period four times the PWM period. Assume that, in the n-th PWM period, the decoder 1181 assigns a first-phase clock signal to one of the two selectors 1182 for generating SFU, and a fourth-phase clock signal to the other. In this case, the AND gate 1183 for generating SFU performs AND operation of the first-phase clock signal and the fourth-phase clock signal, and outputs the minimum pulse width, i.e., the pulse width of ¼ the PWM period as SFU. When the decoder 1181 selects not the forth-phase clock signal but a second-phase or third-phase clock signal, the pulse width of SFU is ¾ or 2/4 the PWM period.

In the following n+1-th PWM period, the decoder 1181 assigns a fifth-phase clock signal to one of the two selectors 1182 for generating SFU, and an eighth-phase clock signal to the other. In this case, the AND gate 1183 for generating SFU performs AND operation of the fifth-phase clock signal and the eighth-phase clock signal, and outputs the minimum pulse width, i.e., the pulse width of ¼ the PWM period as SFU. When the decoder 1181 selects not the eighth-phase clock signal but a sixth-phase or seventh-phase clock signal, the pulse width of SFU is the ¾ or 2/4 PWM period.

In the following n+2-th PWM period, the decoder 1181 assigns the inversion of the first-phase clock signal to one of the two selectors 1182 for generating SFU, and the inversion of the fourth-phase clock signal to the other. In this case, the AND gate 1183 for generating SFU performs AND operation of the inversion of the first-phase clock signal and the inversion of the fourth-phase clock signal, and outputs the minimum pulse width, i.e., the pulse width of ¼ the PWM period as SFU. The inversions of the clock signals may be generated by the DLL 116 or in the selectors 1182.

As such, the digital PWM generator 11 according to this example does not require any operating clock signal faster than the PWM frequency, thereby greatly reducing the power consumption. This leads to reduction in the power consumption of the entire actuator driver.

Seventh Example Configuration of Digital PWM Generator 11

Figure 13:
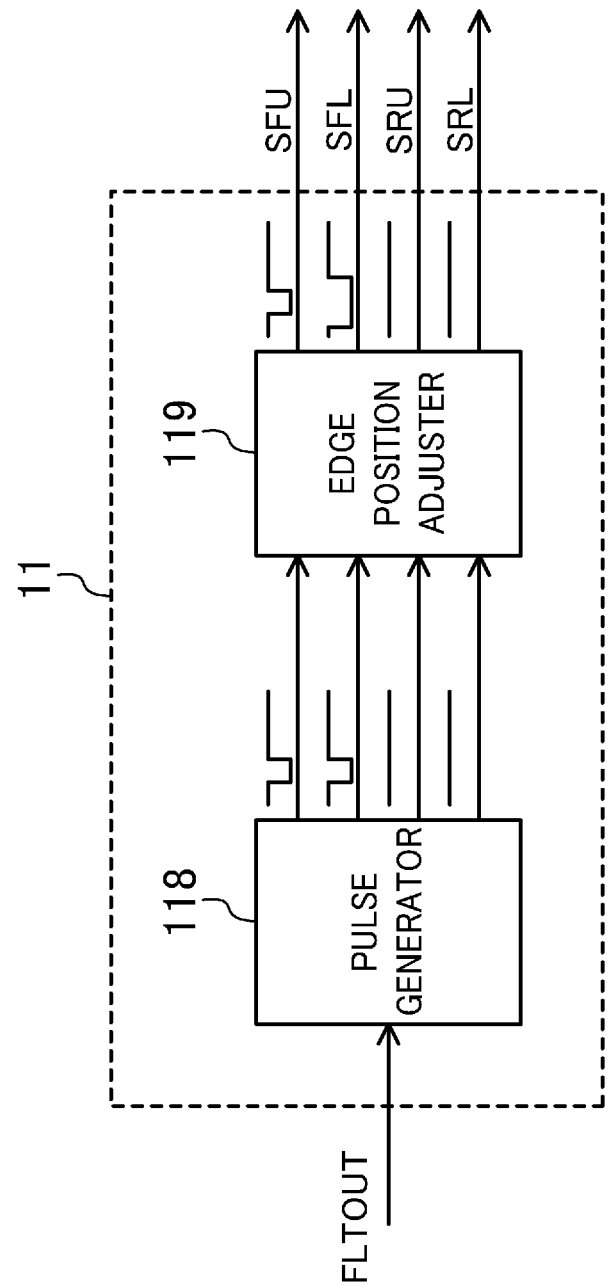
FIG. 13 is a configuration diagram of a digital PWM generator according to a seventh example.

FIG. 13 illustrates the configuration of a digital PWM generator 11 according to a seventh example. The digital PWM generator 11 according to this example includes a pulse generator 118 and an edge position adjuster 119.

The pulse generator 118 outputs SFU, SFL, SRU, and SRL in response to FLTOUT. Specifically, the pulse generator 118 determines which of SFU, SFL, SRU, and SRL should be controlled based on the positive or negative polarity of FLTOUT in each PWM period. The pulse generator 118 further determines the timing of edge generation of the signal to be controlled by counting the time corresponding to the absolute value of FLTOUT using a counter (not shown), which operates with a sufficiently fast clock signal in accordance with the PWM frequency.

The edge position adjuster 119 adjusts the edge positions of SFU, SFL, SRU, and SRL output from the pulse generator 118. The reason for adjusting the edge positions is as follows. The PMOS transistors controlled by SFU and SRU have different threshold voltages from the NMOS transistors controlled by SFL and SRL. Thus, for example, when the position of the falling edge of SFU coincides with the position of the rising edge of SFL, the NMOS transistor 122 shown in FIG. 2 is turned on before the PMOS transistor 121 is turned off so that a current flows through a half-bridge including the PMOS transistor 121 and the NMOS transistor 122.

Figure 14:
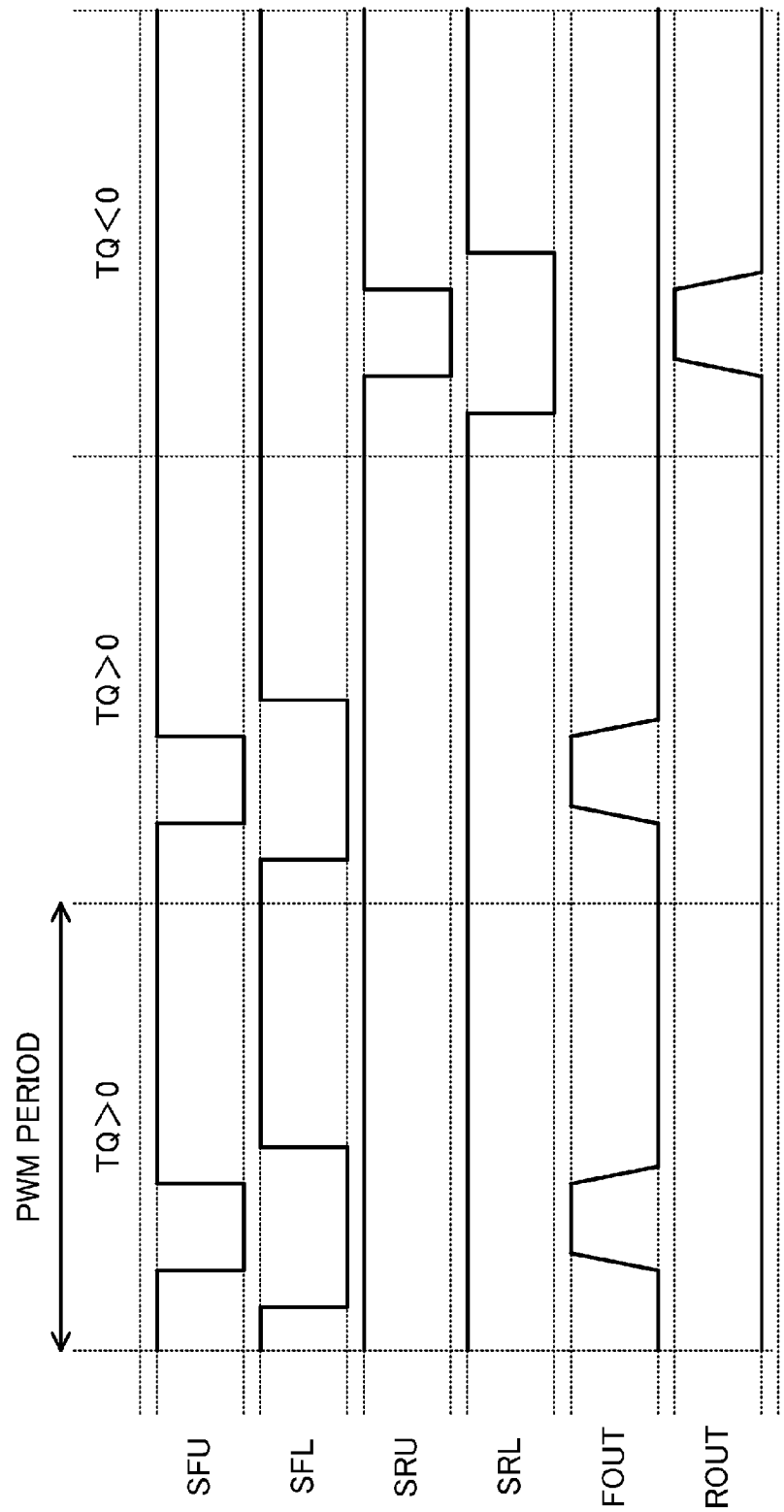
FIG. 14 is a timing chart of edge position-adjusted outputs of the digital PWM generator and outputs of an H bridge.

Specifically, when the edge positions of SFU and SFL coincide, the edge position adjuster 119 shifts the edge positions of SFU and/or SFL to obtain a dead time in which the PMOS transistor 121 and the NMOS transistor 122 shown in FIG. 2 are both off. Similarly, when the edge positions of SRU and SRL coincide, the edge position adjuster 119 shifts the edge positions of SRU and/or SRL to obtain a dead time in which the PMOS transistor 123 and the NMOS transistor 124 shown in FIG. 2 are both off. FIG. 14 illustrates the timing of the edge position-adjusted outputs of the digital PWM generator 11, and the outputs of the H bridge 12.

As such, the digital PWM generator 11 according to this example reduces through currents in the H bridge 12.

Eighth Example Configuration of Digital PWM Generator 11

Figure 15:
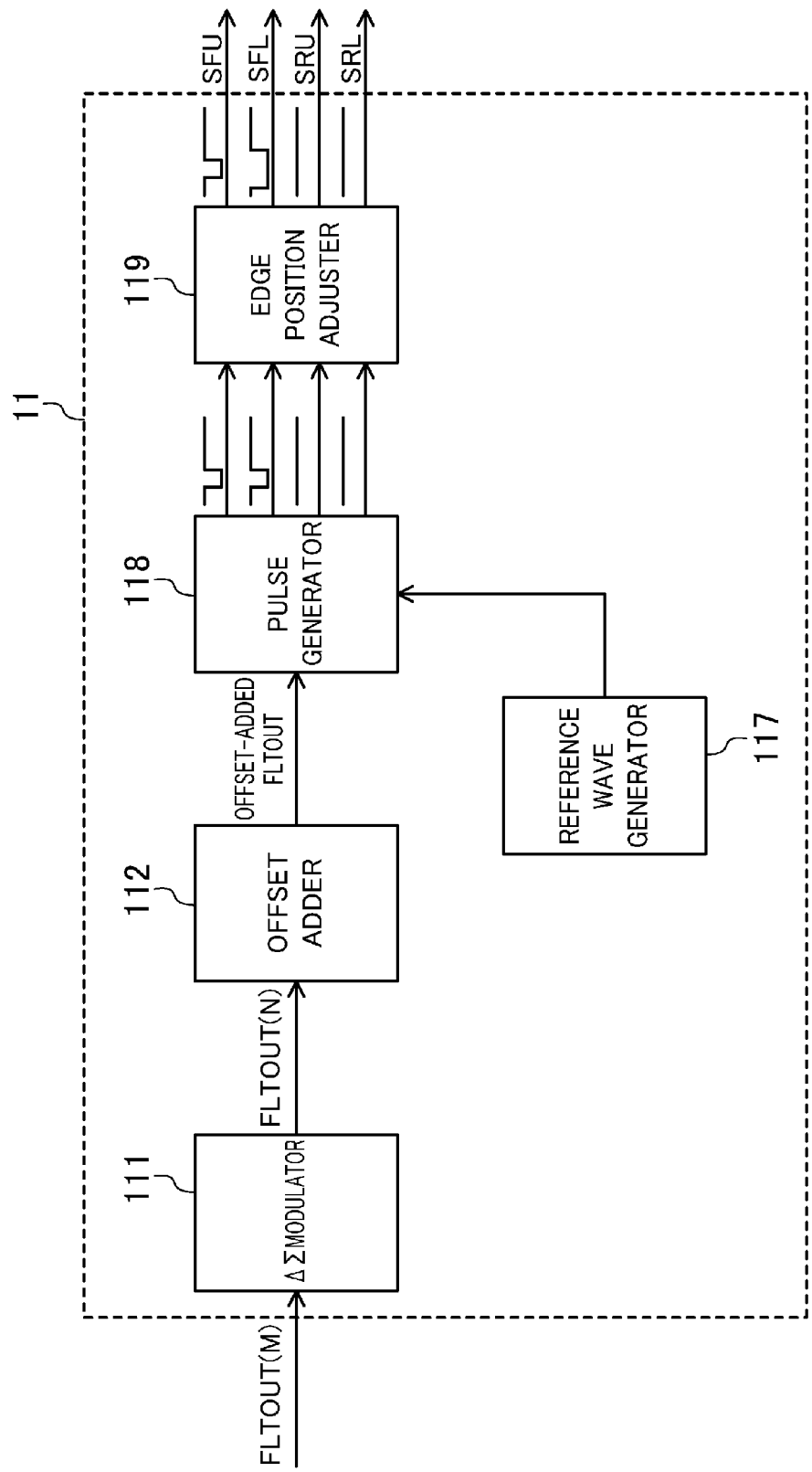
FIG. 15 is a configuration diagram of a digital PWM generator according to an eighth example.

The elements of the digital PWM generators 11 according to the above-described examples may be combined as appropriate. FIG. 15 illustrates the configuration of a digital PWM generator 11 according to an eighth example. The digital PWM generator 11 according to this example includes a ΔΣ modulator 111, an offset adder 112, a reference wave generator 117, a pulse generator 118, and an edge position adjuster 119.

The ΔΣ modulator 111 ΔΣ modulates an input FLTOUT with an M-bit width and rounds the lower bits to generate FLTOUT of N bits.

When the value of the input FLTOUT with the N-bit width is close to zero, the offset adder 112 adds a positive or negative offset to FLTOUT with the N-bit width so that the time average becomes zero. For example, when the absolute value of the input FLTOUT with the N-bit width is smaller than the threshold close to zero, the offset adder 112 inverts the positive or negative sign of the offset and adds the inverted value to FLTOUT with the N-bit width in each PWM period.

The reference wave generator 117 outputs any one of a digital signal representing a value monotonically increasing or decreasing from the initial value in each PWM period, a digital signal representing a value monotonously increasing and decreasing between the lower limit and the upper limit in each PWM period, and multi-phase clock signals having different phases obtained by slightly shifting the phase of an input reference clock signal. Specifically, the reference wave generator 117 is any one of the sawtooth wave generator 113, the triangular wave generator 114, the sawtooth/triangular wave generator 115, and the DLL 116, which have been described above.

The pulse generator 118 outputs SFU, SFL, SRU, and SRL in response to offset-added FLTOUT using the signal output from the reference wave generator 117 as a reference.

The edge position adjuster 119 adjusts the edge positions of SFU, SFL, SRU, and SRL output from the pulse generator 118.

As described above, the digital PWM generator 11 according to this example provides all the particular advantages of the above-described examples.

Referring back to FIG. 1, one of the two continuous time ΔΣ A/D converters 13 converts FOUT from analog to digital, and outputs FADOUT in each PWM period. The other converts ROUT from analog to digital, and outputs the converted RADOUT in each PWM period.

The feed-back filter 14 decimates FADOUT and RADOUT, and feeds back the digital signal SFB to the digital filter 10. That is, the feed-back filter 14 functions to down-sample an oversampled A/D conversion result and to convert a differential signal to a single signal.

Figure 16A:
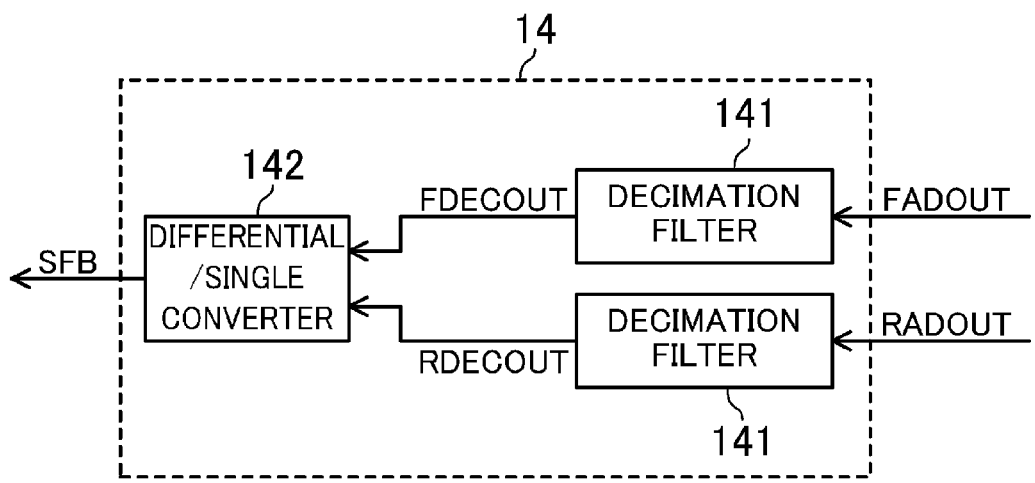
FIGS. 16A and 16B are configuration diagrams of feed-back filters.
Figure 16B:
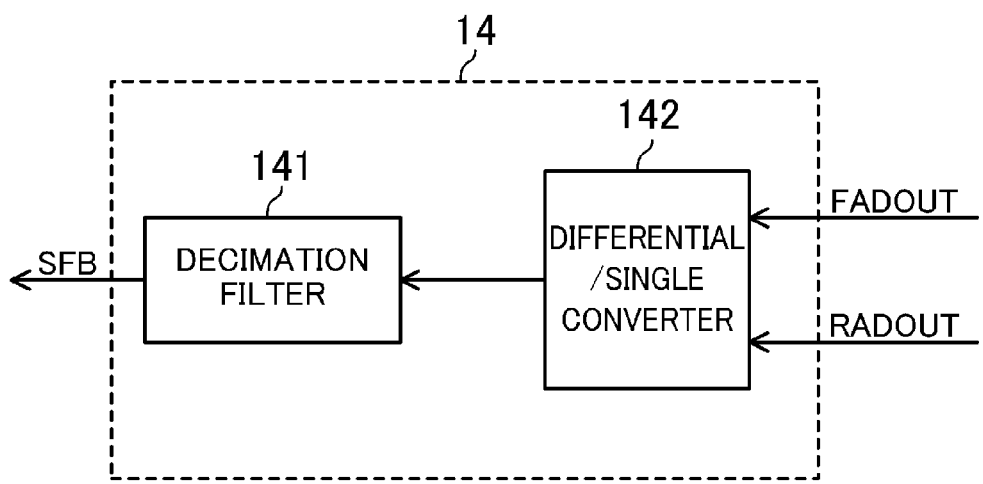

FIGS. 16A and 16B illustrate example configurations of the feed-back filter 14. In the example shown in FIG. 16A, the feed-back filter 14 includes two decimation filters 141 and a differential/single converter 142. One of the two decimation filters 141 performs LPF processing and down-sampling of FADOUT, and outputs FDECOUT. The other performs LPF processing and down-sampling of RADOUT, and outputs RDECOUT. The differential/single converter 142 calculates the difference between FDECOUT and RDECOUT, and outputs SFB representing the difference value. On the other hand, in the example shown in FIG. 16B, the feed-back filter 14 includes a differential/single converter 142 and a decimation filter 141. The differential/single converter 142 outputs the difference between FADOUT and RADOUT. The decimation filter 141 performs LPF processing and down-sampling of the outputs of the differential/single converter 142, and outputs SFB.

As such, the two continuous time A/D converters 13 and the feed-back filter 14 indicate a current value supplied to the load 100 in one PWM period as SFB.

The feed-back filter 14 may have the function of digital correction of correcting the conversion errors of the continuous time ΔΣ A/D converters 13. Specifically, the feed-back filter 14 performs offset adjustment and gain adjustment of the results of the continuous time ΔΣ A/D converters 13, which have been subjected to the LPF processing and the down-sampling, and outputs the adjusted values as FDECOUT or RDECOUT. Where the feed-back filter 14 has the configuration shown in FIG. 16A, each of the two decimation filters 141 may execute the digital correction. On the other hand, where the feed-back filter 14 has the configuration shown in FIG. 16B, the differential/single converter 142 may execute the digital correction.

The offset adjusting value and the gain adjusting value may be calculated from an error between an ideal value and a result of the A/D conversion when a predetermined test voltage is applied to FOUT or ROUT. These adjusting values may be calculated in a test before the shipment of the product and unchanged later, or may be calculated and updated, for example, every time when the actuator driver is activated.

The feed-back filter 14 may have the function of digital correction of correcting DC offsets of the entire system of the actuator driver. Specifically, the feed-back filter 14 performs offset adjustment of the difference between FDECOUT and RDECOUT, and outputs the adjusted value as SFB. Where the feed-back filter 14 has the configuration shown in FIG. 16A, the differential/single converter 142 may execute the digital correction. On the other hand, where the feed-back filter 14 has the configuration shown in FIG. 16B, the decimation filter 141 may execute the digital correction.

The offset adjusting value may be calculated from the difference between FDECOUT and RDECOUT when "0" is given as TQ with the feed-back loop of the actuator driver open. The adjusting value may be calculated in a test before the shipment of the product and unchanged later, or may be calculated and updated, for example, every time when the actuator driver is activated.

As described above, in this embodiment, FOUT and ROUT output from the H bridge 12 are individually converted from analog to digital, and differential/single conversion is performed in the digital domain. If the differential/single conversion of FOUT and ROUT is performed in the analog domain, a differential/single converter with an extremely complicated configuration needs to be provided at a stage prior to the A/D converter, since FOUT and ROUT are asymmetric signals regardless of the reverse polarity. By contrast, in this embodiment, there is no need to consider the asymmetrical relation between FOUT and ROUT, and the circuit configuration of the feed-back filter 14 is simplified.

In this embodiment, the continuous time $\Delta\Sigma$ A/D converters 13 are used to oversample FOUT and ROUT, thereby highly accurately converting FOUT and ROUT from analog to digital, while reducing quantization noise.

Second Embodiment

Figure 17:
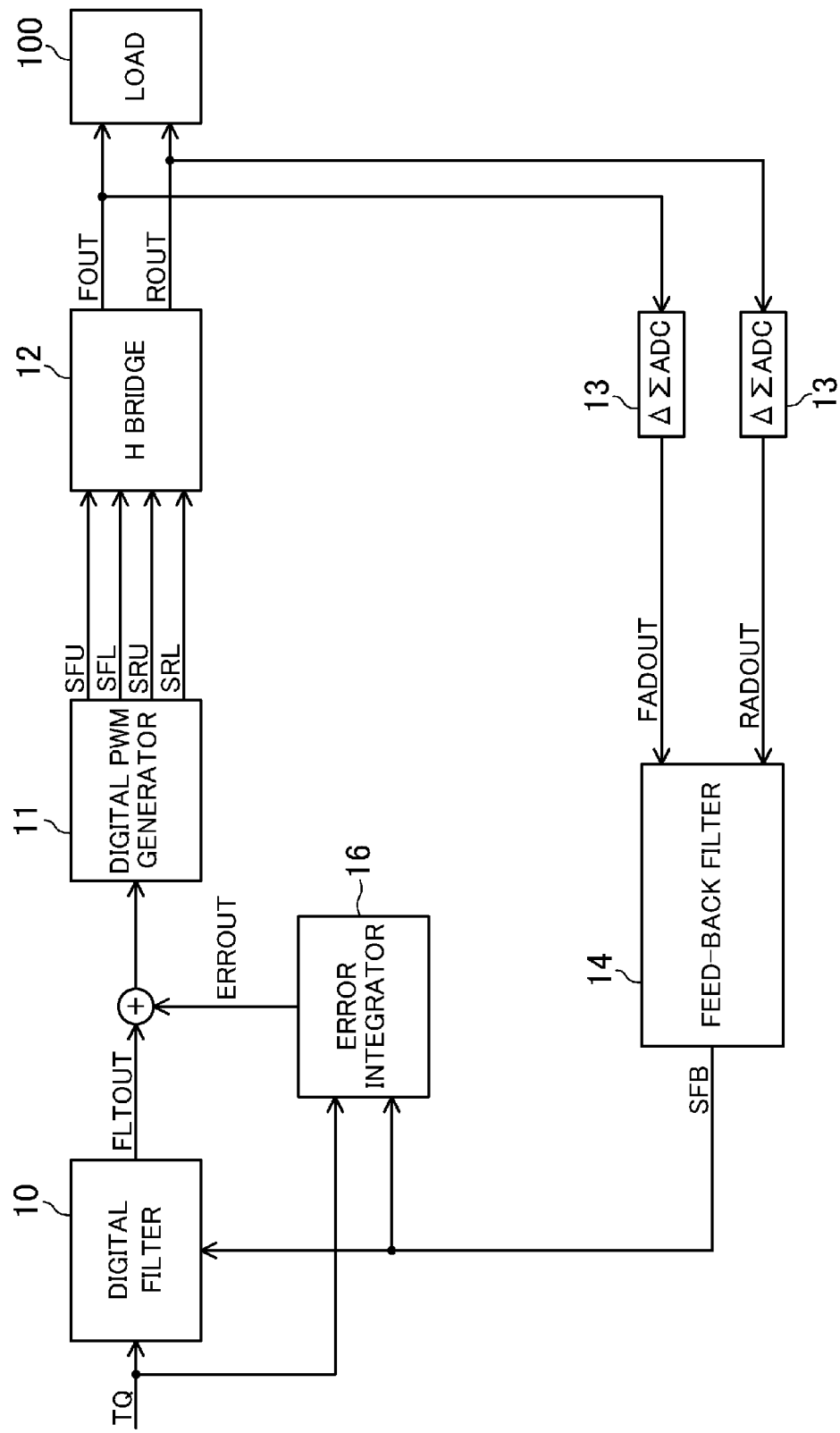
FIG. 17 is a configuration diagram of an actuator driver according to a second embodiment.

FIG. 17 illustrates the configuration of an actuator driver according to a second embodiment. The actuator driver according this embodiment includes an error integrator 16 in addition to the actuator driver according to the first embodiment.

The error integrator 16 adds the value obtained by integrating the error between TQ and SFB to FLTOUT output from a digital filter 10 to correct FLTOUT.

A digital PWM generator 11 outputs SFU, SFL, SRU, and SRL in response to the corrected FLTOUT. Specifically, the digital PWM generator 11 determines which of SFU, SFL, SRU, and SRL should be controlled based on the positive or negative polarity of the corrected FLTOUT in each PWM period. The digital PWM generator 11 further determines the timing of edge generation of the signal to be controlled based on the absolute value of the corrected FLTOUT.

The configurations and operation of the other elements are as described above in the first embodiment.

If there is no error integrator 16, the feed-back loop may be locked in the state where the phase of TQ is shifted from the phase of SFB due to, for example, a quantization error caused by a variation in the power supply voltage of an H bridge 12. By contrast, as in this embodiment, the feed-back is performed such that TQ and SFB have substantially the same phase by providing the error integrator 16. This increases the accuracy of the actuator driver.

Third Embodiment

Figure 18:
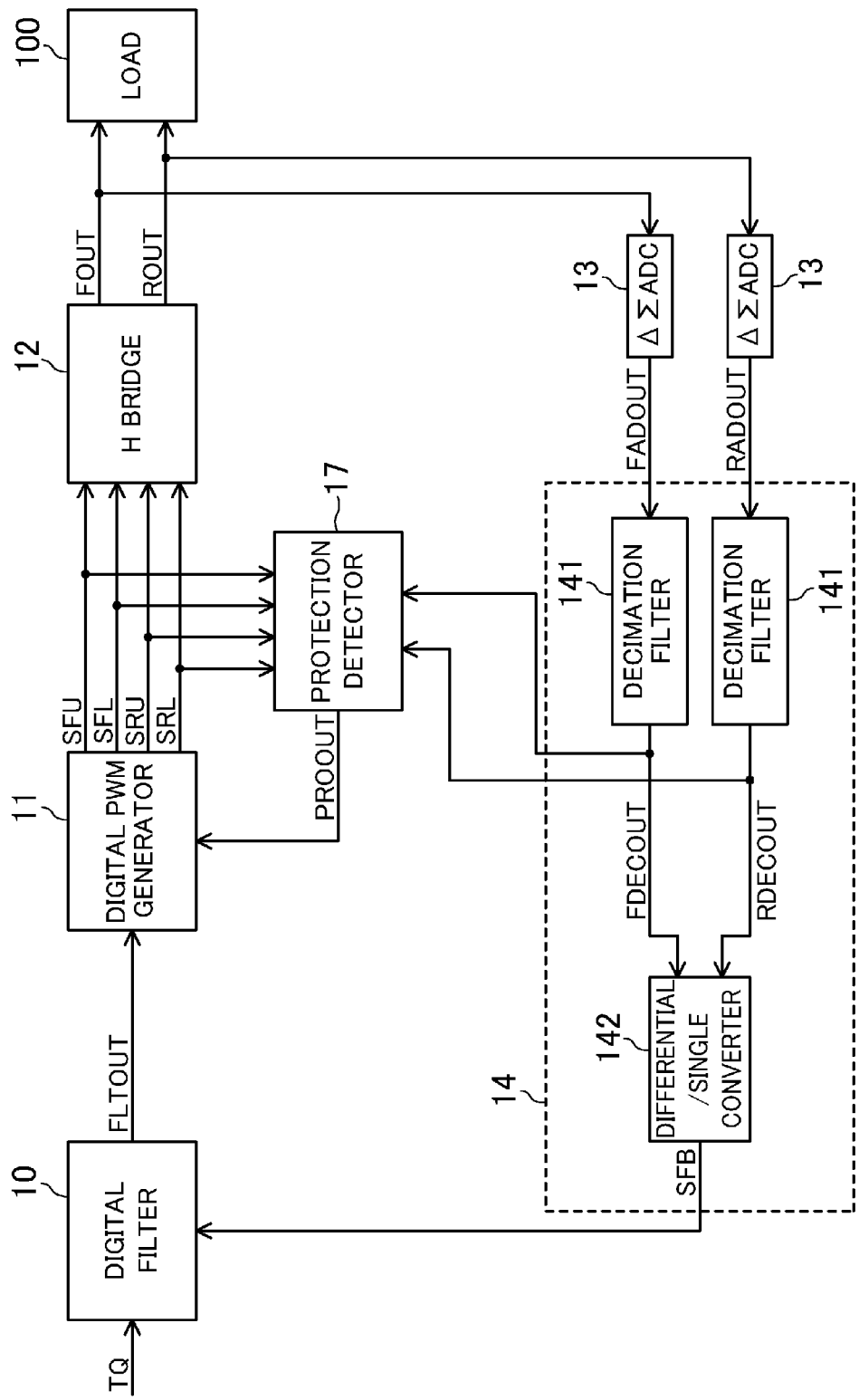
FIG. 18 is a configuration diagram of an actuator driver according to a third embodiment.

FIG. 18 illustrates the configuration of an actuator driver according to a third embodiment. The actuator driver according this embodiment includes a protection detector 17 in addition to the actuator driver according to the first embodiment.

If a load 100 is continuously driven with an output of the actuator driver having a power supply fault or an earth fault, an abnormal voltage may damage the transistors forming an H bridge 12. In order to protect the H bridge 12 from being damaged, the protection detector 17 determines whether or not FOUT and ROUT are properly output in accordance with the control by a digital PWM generator 11, and stops an output of the actuator driver upon detection of an improper output.

Specifically, where a feed-back filter 14 has the configuration shown in FIG. 16A, the protection detector 17 outputs a protection signal PROOUT upon detecting that SFU, SFL, SRU, and SRL output from the digital PWM generator 11 and FDECOUT and RDECOUT output from two decimation filters 141 do not satisfy predetermined logical conditions. There is no need to refer to all bits of FDECOUT and RDECOUT, as long as whether or not FOUT and ROUT are output can be determined. When input H/L data is converted to data with signs +1/−1 at the first stage of each decimation filter 141, reference to the sign bit of an output value of the decimation filter 141 suffices. How to refer is not limited thereto.

For example, as shown in FIG. 14, when SFU and SFL are at an L level and SRU and SRL are at an H level, FOUT should be output and ROUT should not output. If FOUT is not output or ROUT is output, the protection detector 17 detects that the logical conditions are not satisfied, and outputs PROOUT. When SFU and SFL are at an H level and SRU and SRL are at an L level, ROUT should be output and FOUT should not be output. If ROUT is not output or FOUT is output, the protection detector 17 detects that the logical conditions are not satisfied, and outputs PROOUT.

PROOUT is, for example, input to the digital PWM generator 11. The digital PWM generator 11 fixes the values of SFU, SFL, SRU, and SRL to turn off the all switches in the H bridge 12 upon receipt of PROOUT. This stops the output of the actuator driver. PROOUT may be input to the H bridge 12 to directly stop the operation of the H bridge 12.

Figure 19:
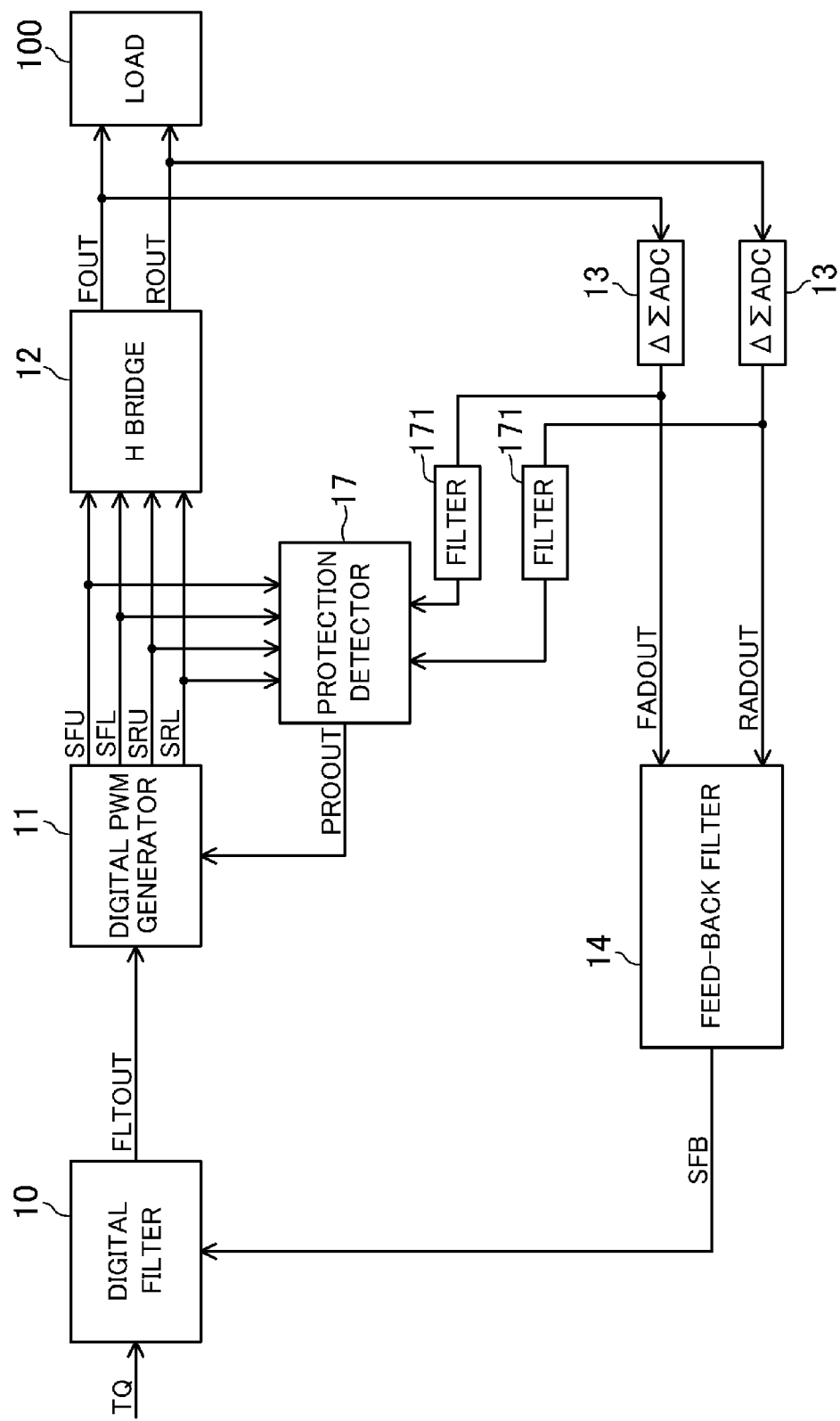
FIG. 19 is a configuration diagram of an actuator driver according to a variation of the third embodiment.

As shown in FIG. 19, the protection detector 17 may determine whether or not FOUT and ROUT are output with reference to FADOUT and RADOUT instead of FDECOUT and RDECOUT. In this case, however, the protection detector 17 does not refer to FADOUT and RADOUT directly, but needs to refer to a value obtained by integrating FADOUT and RADOUT via filters 171. The filters 171 may be, for example, FIR filters.

Fourth Embodiment

Figure 20:
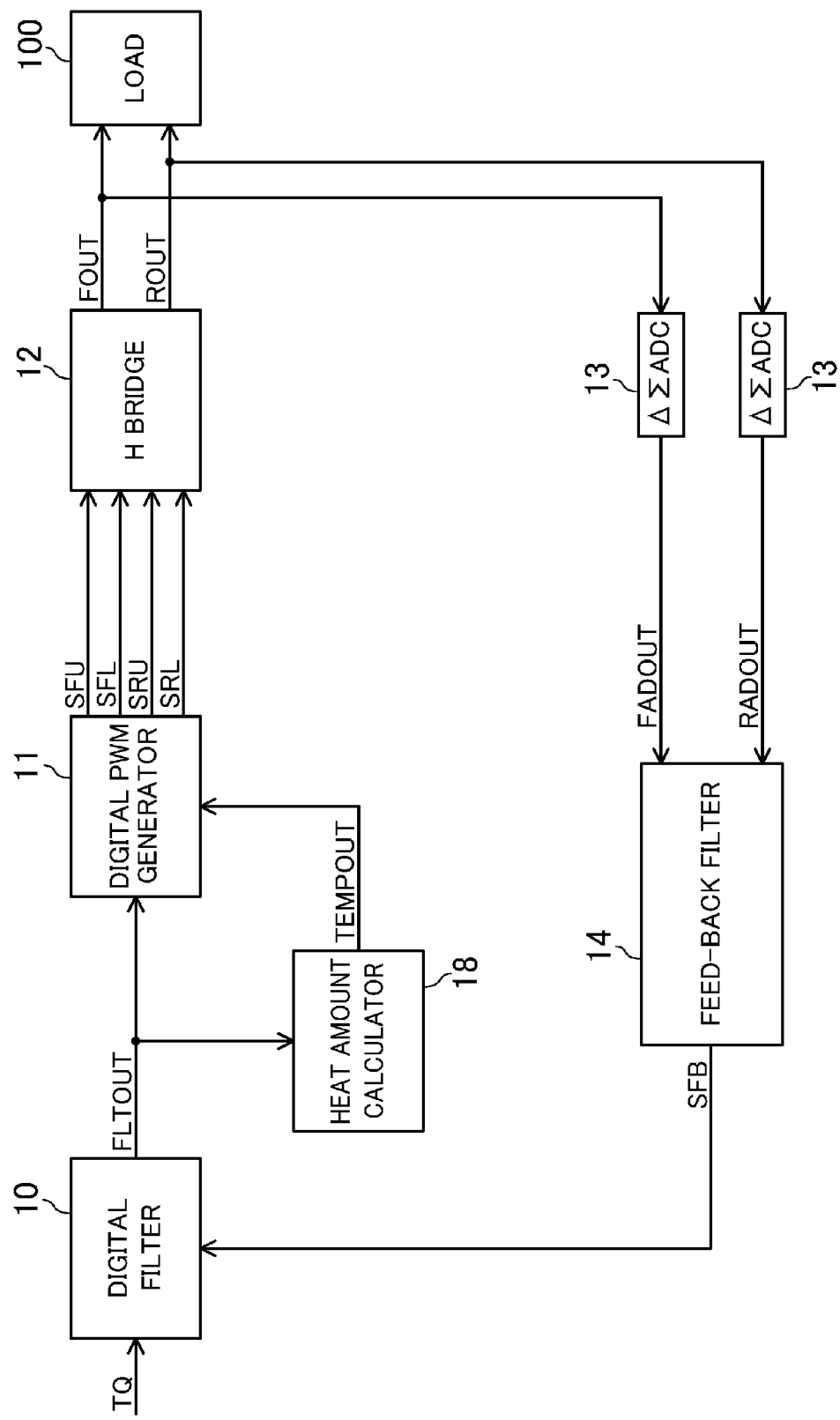
FIG. 20 is a configuration diagram of an actuator driver according to a fourth embodiment.

FIG. 20 illustrates the configuration of an actuator driver according to a fourth embodiment. The actuator driver according this embodiment includes a heat amount calculator 18 in addition to the actuator driver according to the first embodiment.

A load 100 contains a resistive component, and thus generates heat when a current flows to the load 100. When the current continually flows through the load 100, the heat is accumulated and the temperature rises. This heat may damage the load 100. In order to protect the load 100 from being damaged, the heat amount calculator 18 calculates the amount of the heat generated in the load 100, and stops an output of the actuator driver when the amount of the heat exceeds the threshold.

Specifically, the heat amount calculator 18 calculates the amount of the heat generated in the load 100 from FLTOUT output from the digital filter 10 in each PWM period, accumulates the amount from the initial value, and outputs a protection signal TEMPOUT when the accumulated amount of the heat exceeds the threshold.

When the absolute value of FLTOUT is great, the duty cycle of PWM control increases, thereby increasing the amount of the heat generated in the load 100. On the other hand, when the absolute value of FLTOUT is small, the duty cycle of PWM control decreases, thereby reducing the amount of the heat generated in the load 100. Occasionally, the load 100 releases the heat. That is, the amount of heat has a negative value. As such, the amount of the heat generated in the load 100 can be uniquely determined by FLTOUT. Therefore, the heat amount calculator 18 easily calculates the amount of the heat generated in the load 100 from FLTOUT by referring to a look-up table, etc. storing the correspondence relationship between FLTOUT and the amount of the generated heat.

TEMPOUT is, for example, input to the digital PWM generator 11. The digital PWM generator 11 fixes the values of SFU, SFL, SRU, and SRL to turn off the all switches in an H bridge 12 upon receipt of TEMPOUT. This stops the output of the actuator driver. TEMPOUT may be input to the H bridge 12 to directly stop the operation of the H bridge 12.

Figure 21:
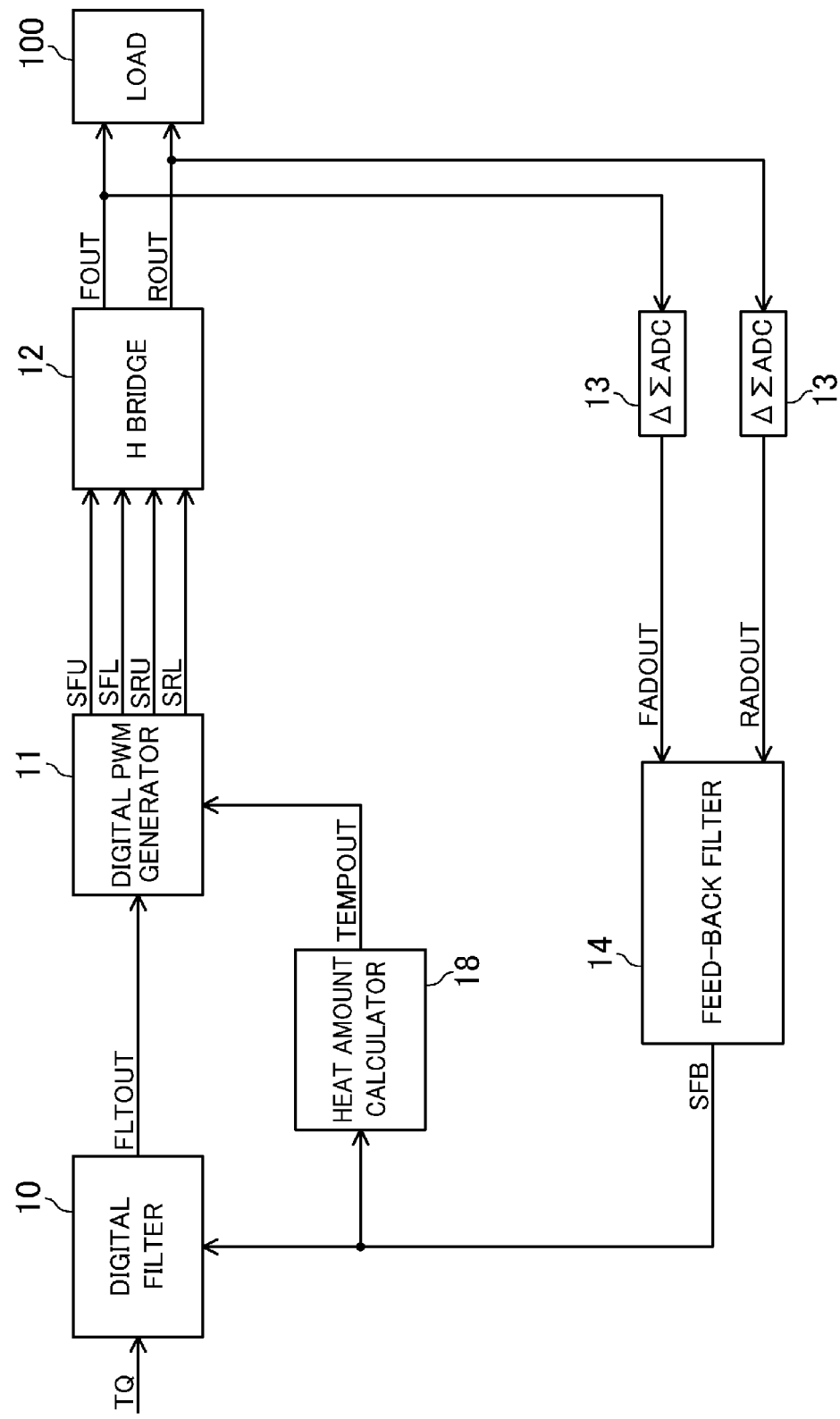
FIG. 21 is a configuration diagram of an actuator driver according to a variation of the fourth embodiment.
Figure 22:
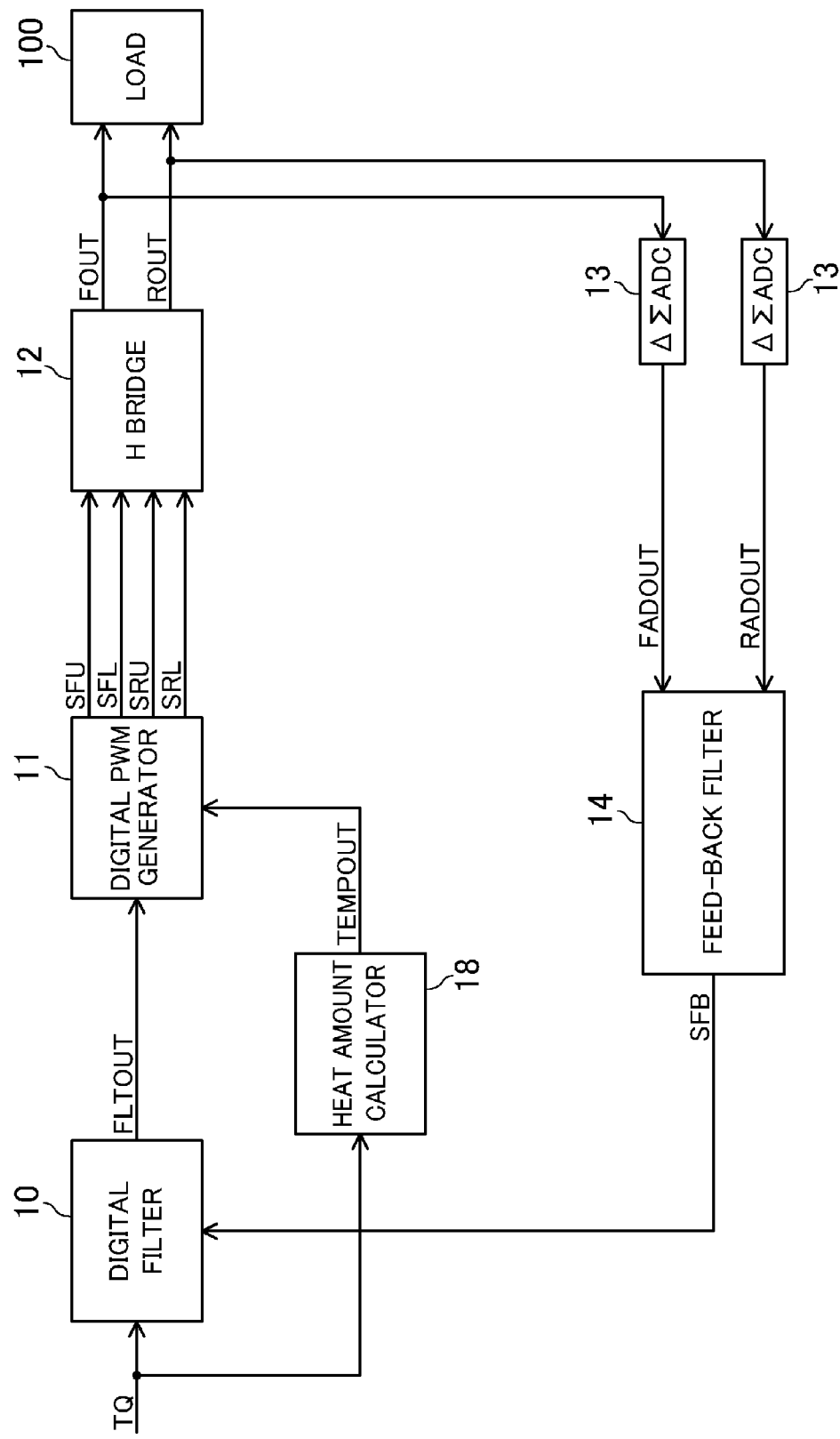
FIG. 22 is a configuration diagram of an actuator driver according to another variation of the fourth embodiment.

As shown in FIG. 21, the heat amount calculator 18 may calculate the amount of the heat generated in the load 100 from SFB output from the feed-back filter 14 instead of FLTOUT in each PWM period, accumulate the amount from the initial value, and output the protection signal TEMPOUT when the accumulated amount of the heat exceeds the threshold. Alternatively, as shown in FIG. 22, the heat amount calculator 18 may calculate the amount of the heat generated in the load 100 from TQ instead of FLTOUT in each PWM period, accumulate the amount from the initial value, and output the protection signal TEMPOUT when the accumulated amount of the heat exceeds the threshold.

Fifth Embodiment

Figure 23:
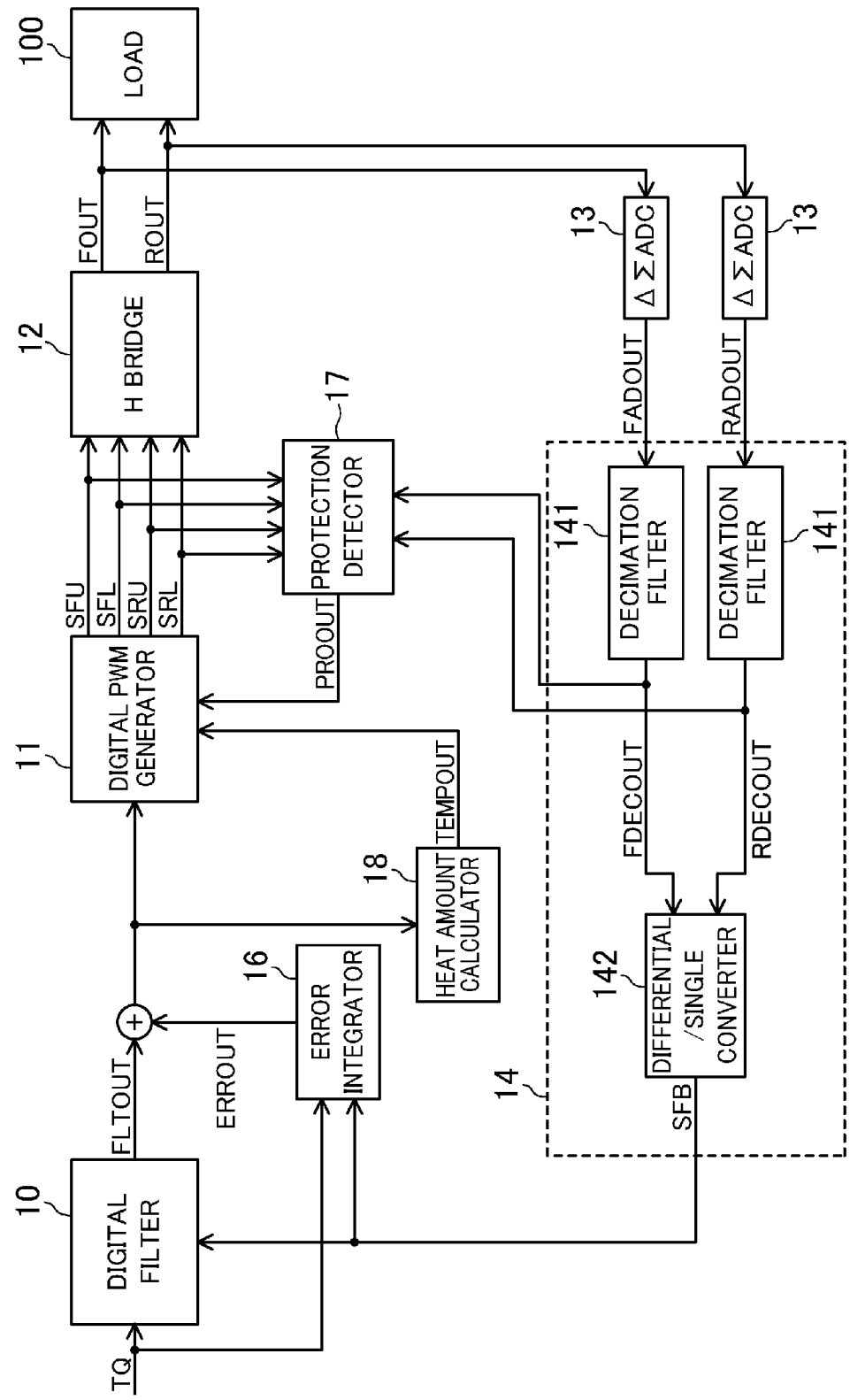
FIG. 23 is a configuration diagram of an actuator driver according to a fifth embodiment.

FIG. 23 illustrates the configuration of an actuator driver according to a fifth embodiment. The actuator driver according this embodiment includes an error integrator 16, a protection detector 17, and a heat amount calculator 18 in addition to the actuator driver according to the first embodiment.

The error integrator 16 adds the value obtained by integrating the error between TQ and SFB to FLTOUT output from a digital filter 10 to correct FLTOUT.

A digital PWM generator 11 outputs SFU, SFL, SRU, and SRL in response to the corrected FLTOUT. Specifically, the digital PWM generator 11 determines which of SFU, SFL, SRU, and SRL should be controlled based on the positive or negative polarity of the corrected FLTOUT in each PWM period. The digital PWM generator 11 further determines the timing of edge generation of the signal to be controlled based on the absolute value of the corrected FLTOUT.

The protection detector 17 determines whether or not FOUT and ROUT are properly output in accordance with the control of the digital PWM generator 11, and stops an output of the actuator driver upon detection of an improper output. Specifically, where the feed-back filter 14 has the configuration shown in FIG. 16A, the protection detector 17 outputs a protection signal PROOUT upon detecting that SFU, SFL, SRU, and SRL output from the digital PWM generator 11 and FDECOUT and RDECOUT output from two decimation filters 141 do not satisfy predetermined logical conditions.

The heat amount calculator 18 calculates the amount of the heat generated in the load 100, and stops an output of the actuator driver when the amount of the heat exceeds the threshold. Specifically, the heat amount calculator 18 calculates the amount of the heat generated in the load 100 from FLTOUT output from the digital filter 10 in each PWM period, accumulates the amount from the initial value, and outputs a protection signal TEMPOUT when the accumulated amount of the heat exceeds the threshold.

PROOUT and TEMPOUT are, for example, input to the digital PWM generator 11. The digital PWM generator 11 fixes the values of SFU, SFL, SRU, and SRL to turn off the all switches in the H bridge 12 upon receipt of PROOUT or TEMPOUT. This stops the output of the actuator driver. PROOUT and TEMPOUT may be input to the H bridge 12 to directly stop the operation of the H bridge 12.

The configurations and operation of the other elements are as described above in the first embodiment.

As described above, this embodiment provides all the particular advantages of the first to fourth embodiments.

Sixth Embodiment

Figure 24:
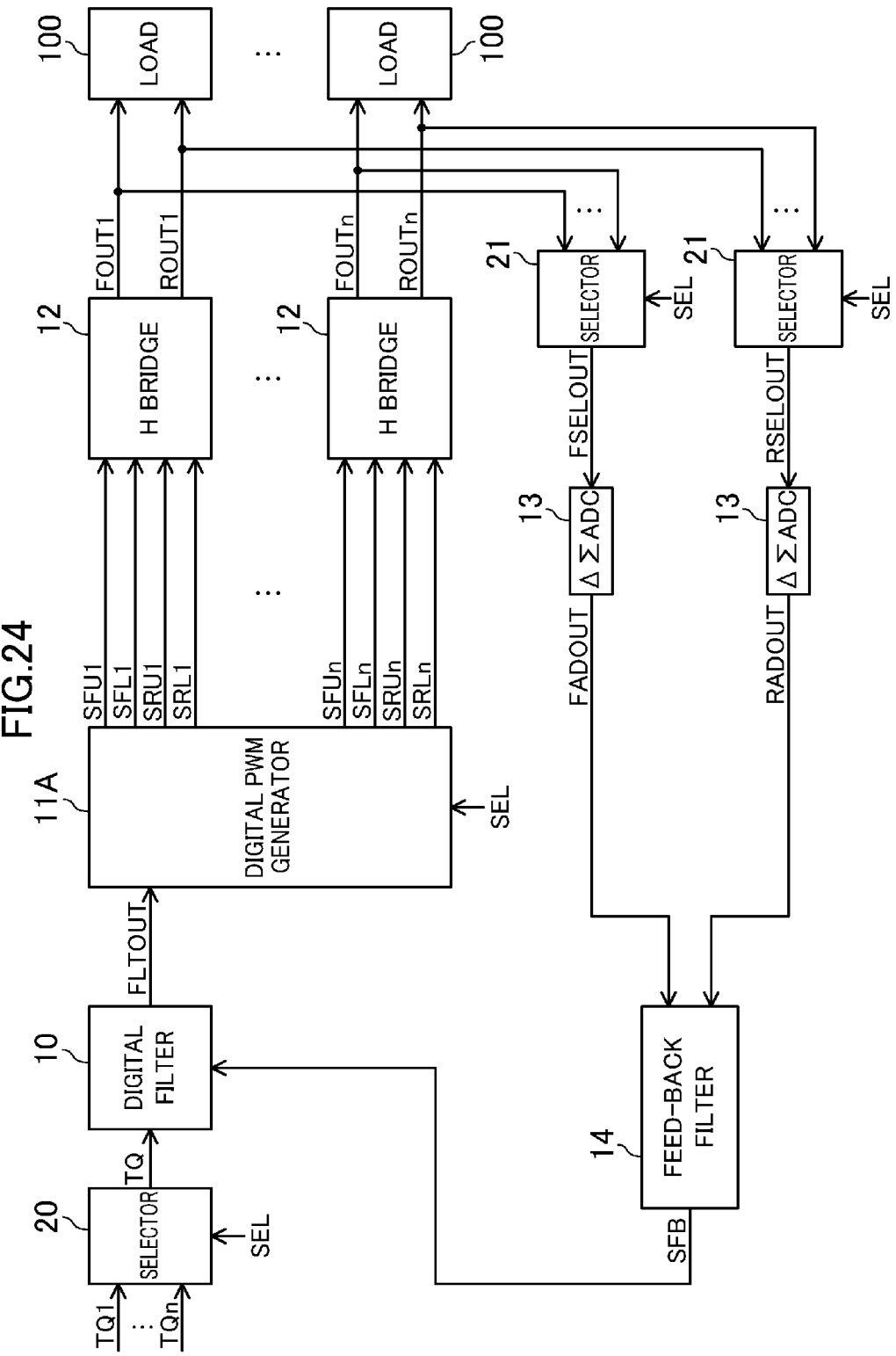
FIG. 24 is a configuration diagram of an actuator driver according to a sixth embodiment.

FIG. 24 illustrates the configuration of an actuator driver according to a sixth embodiment. The actuator driver according this embodiment drives n loads 100, where n is an integer of two or more, in response to n digital torque command signals TQ1-TQn input from an external controller (not shown).

Specifically, the actuator driver includes a selector 20, a digital filter 10, a digital PWM generator 11A, n H bridges 12, two selectors 21, two continuous time ΔΣ A/D converters 13, and a feed-back filter 14. These elements can be digital circuits, except for the n H bridges 12 and the two continuous time ΔΣ A/D converters 13, which are interfaces with the n load 100. These elements will be described below in detail.

The selector 20 selects any one of TQ1-TQn designated by a selection signal SEL, and outputs the selected one as TQ.

The digital filter 10 performs phase compensation of TQ using a digital signal SFB fed back from the feed-back filter 14, and outputs the digital signal FLTOUT. Specifically, the digital filter 10 performs PI control or PID control of a difference value between TQ and SFB to generate FLTOUT.

The digital PWM generator 11A outputs SFU1-SFUn, SFL1-SFLn, SRU1-SRUn, and SRL1-SRLn in response to FLTOUT. Specifically, the digital PWM generator 11A generates n groups of four PWM signals SFUi, SFLi, SRUi, and SRLi, and outputs the signals to the n H bridges 12. Note that i is an integer ranging from one to n. Specifically, the digital PWM generator 11A determines which of SFUi, SFLi, SRUi, and SRLi belonging to the group designated by SEL should be controlled based on the positive or negative polarity of FLTOUT in each PWM period. The digital PWM generator 11A further determines the timing of edge generation of the signal to be controlled based on the absolute value of FLTOUT.

The digital PWM generator 11A may be formed by, for example, providing n digital PWM generators 11 in the actuator driver according to the first embodiment, inputting a common signal FLTOUT to the n digital PWM generators 11, and operating one of the n digital PWM generators 11 in response to SEL. If one of the digital PWM generators 11 includes the ΔΣ modulator 111, the offset adder 112, the sawtooth wave generator 113, the triangular wave generator 114, the sawtooth/triangular wave generator 115, the DLL 116, etc., which have been described above, these elements may be shared by the n digital PWM generators 11.

Each of the H bridges 12 is controlled by four PWM signals SFUi, SFLi, SRUi, and SRLi of the corresponding one of the group, and outputs FOUTi and ROUTi. FOUTi and ROUTi are input to each of the loads 100. That is, the H bridge 12 supplies a current to the corresponding one of the loads 100.

One of the two selectors 21 outputs as FSELOUT, any one of FOUT1-FOUTn designated by SEL. The other outputs as RSELOUT, any one of ROUT1-ROUTn designated by SEL.

One of the two continuous time ΔΣ A/D converters 13 converts FSELOUT from analog to digital, and outputs FADOUT in each PWM period. The other converts RSELOUT from analog to digital, and outputs RADOUT in each PWM period.

The feed-back filter 14 decimates outputs of the two continuous time ΔΣ A/D converters, and feeds back the digital signal SFB to the digital filter 10. That is, the feed-back filter 14 functions to down-sample an oversampled A/D conversion result and to convert a differential signal to a single signal. The configuration examples of the feed-back filter 14 are as described above with reference to FIGS. 16A and 16B.

As such, the two continuous time A/D converters 13 and the feed-back filter 14 indicate as SFB, a current value supplied to the load 100 in one PWM period.

The feed-back filter 14 may have the function of digital correction of correcting conversion variations of the continuous time ΔΣ A/D converters 13. Specifically, the feed-back filter 14 performs offset adjustment and gain adjustment of the results of the continuous time ΔΣ A/D converters 13, which have been subjected to the LPF processing and the down-sampling, and outputs the adjusted values as FDECOUT or RDECOUT. Where the feed-back filter 14 has the configuration shown in FIG. 16A, each of the two decimation filters 141 may execute the digital correction. On the other hand, where the feed-back filter 14 has the configuration shown in FIG. 16B, the differential/single converter 142 may execute the digital correction.

The offset adjusting value and the gain adjusting value may be calculated from an error between an ideal value and a result of A/D conversion when SEL is set to a value designating the i-th signal and a predetermined test voltage is applied to FOUTi or ROUTi. These adjusting values may be calculated in a test before the shipment of the product and unchanged later, or may be calculated and updated, for example, every time when the actuator driver is activated.

The feed-back filter 14 may have the function of digital correction of correcting variations in DC offsets of the entire system of the actuator driver. Specifically, the feed-back filter 14 performs offset adjustment of the difference between FDECOUT and RDECOUT, and outputs the adjusted value as SFB. Where the feed-back filter 14 has the configuration shown in FIG. 16A, the differential/single converter 142 may execute the digital correction. On the other hand, where the feed-back filter 14 has the configuration shown in FIG. 16B, the decimation filter 141 may execute the digital correction.

The offset adjusting value may be calculated from the difference between FDECOUT and RDECOUT when "0" is given as TQi, with SEL set to the value designating the i-th signal, and with the feed-back loop of the actuator driver open. The offset adjusting value may be calculated in a test before the shipment of the product and unchanged later, or may be calculated and updated, for example, every time when the actuator driver is activated.

Although not shown, all or any of the error integrator 16, the protection detector 17, and the heat amount calculator 18 may be incorporated into the actuator driver according this embodiment.

Figure 25:
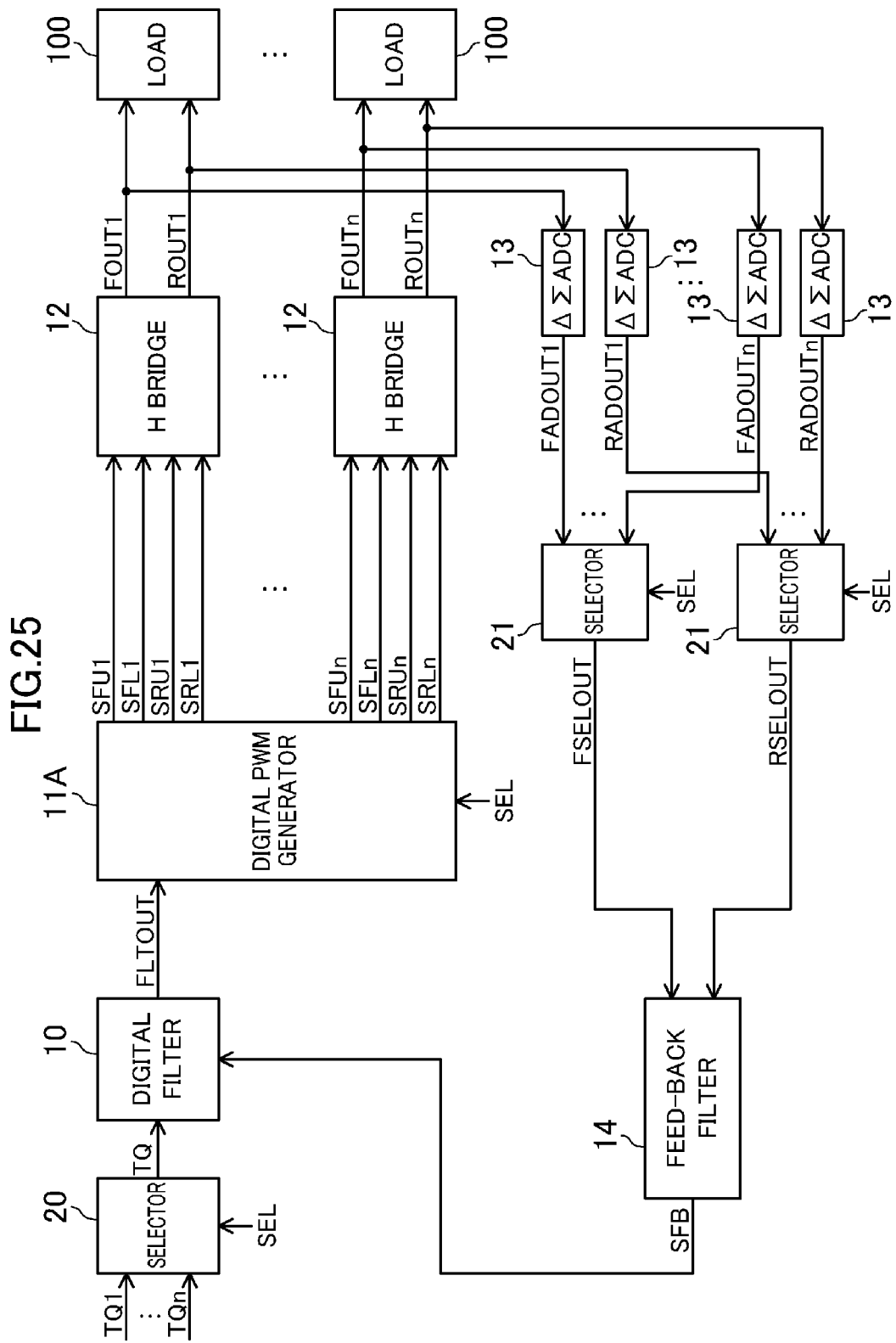
FIG. 25 is a configuration diagram of an actuator driver according to a variation of the sixth embodiment.

As shown in FIG. 25, the two selectors 21 may be located at a stage immediately before the feed-back filter 14. In this case, there is a need to provide 2n continuous time ΔΣ A/D converters 13. The 2n continuous time ΔΣ A/D converters 13 convert FOUT1-FOUTn and ROUT1-ROUTn from analog to digital, and outputs FADOUT1-FADOUTn and RADOUT1-RADOUTn. One of the two selectors 21 outputs as FSELOUT, any one of FADOUT1-FADOUTn designated by SEL. The other outputs as RSELOUT, any one of RADOUT1-RADOUTn designated by SEL. Then, the feed-back filter 14 decimates FSELOUT and RSELOUT, and feeds back the digital signal SFB to the digital filter 10.

As described above, in this embodiment, the n H bridges 12 time-share the digital filter 10, the two continuous time ΔΣ A/D converters 13, and the feed-back filter 14. This enables miniaturization of the actuator driver which highly accurately drives the plurality of loads. When the actuator driver is applied to, for example, an optical disk device, the single actuator driver controls a sled motor, a loading motor, a spindle motor, and the tilt direction, the tracking direction, and the focus direction of the optical pick-up device in a time-shared manner.

As described above, the first to sixth embodiments have been described as example techniques disclosed in the present application. However, the techniques according to the present disclosure are not limited to these embodiments, but are also applicable to those where modifications, substitutions, additions, and omissions are made. In addition, elements described in the first to sixth embodiments may be combined to provide a different embodiment.

Various embodiments have been described above as example techniques of the present disclosure, in which the attached drawings and the detailed description are provided.

As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. An actuator driver including a first terminal and a second terminal, selecting a current path of the first terminal or the second terminal, and outputting a first or second terminal voltage in response to at least one input digital torque command signal to drive an actuator, the actuator driver comprising:
   a digital filter configured to perform phase compensation of the digital torque command signal using a fed-back digital signal;
   a digital PWM generator configured to generate a plurality of pulse-width modulated PWM control signals in response to an output of the digital filter;
   at least one H bridge configured to select and output the first or second terminal voltage in response to the plurality of PWM control signals;
   a first continuous time ΔΣ A/D converter;
   a second continuous time ΔΣ A/D converter; and
   a feed-back filter, wherein
   one of the first continuous time ΔΣ A/D converter or the second continuous time ΔΣ A/D converter converts the first terminal voltage from analog to digital in each PWM period, and outputs a digital signal, the other one of the continuous time ΔΣ A/D converters converts the second terminal voltage from analog to digital in the PWM period, and outputs a digital signal, and the feed-back filter decimates outputs of the first and second continuous time ΔΣ A/D converters to feed back the digital signals to the digital filter, wherein the feed-back filter includes first and second decimation filters configured to filter the outputs of the first and second continuous time ΔΣ A/D converters, respectively, and a differential/single converter configured to calculate a difference between outputs of the first and second decimation filters, and feed back a digital signal indicating the difference to the digital filter.

2. The actuator driver of claim 1, wherein the digital PWM generator ΔΣ modulates the output of the digital filter, and generates the plurality of PWM control signals in response to a ΔΣ modulated digital signal.

3. The actuator driver of claim 2, wherein when the ΔΣ modulated digital signal has a value close to zero, the digital PWM generator adds a positive or negative offset to the ΔΣ modulated digital signal so that a time average is zero, and generates the plurality of PWM control signals in response to an offset-added digital signal.

4. The actuator driver of claim 1, wherein when the output of the digital filter has a value close to zero, the digital PWM generator adds a positive or negative offset to the output of the digital filter so that a time average is zero, and generates the plurality of PWM control signals in response to an offset-added digital signal.

5. The actuator driver of claim 1, wherein the digital PWM generator generates a sawtooth wave as a reference wave for pulse width modulation.

6. The actuator driver of claim 1, wherein the digital PWM generator generates a triangular wave as a reference wave for pulse width modulation.

7. The actuator driver of claim 1, wherein the digital PWM generator generates a sawtooth wave or a triangular wave as a reference wave for pulse width modulation in response to the output of the digital filter.

8. The actuator driver of claim 1, wherein the digital PWM generator generates multi-phase clock signals having different phases by slightly shifting a phase of an input reference clock signal, selects two of the multi-phase clock signals in response to the output of the digital filter, and performs logical operation of the selected two clock signals to generate the plurality of PWM control signals.

9. The actuator driver of claim 1, wherein the digital PWM generator shifts edge positions of the plurality of PWM control signals.

10. The actuator driver of claim 1, wherein the feed-back filter functions to correct conversion errors of the first and second continuous time ΔΣ A/D converters.

11. The actuator driver of claim 1, wherein the feed-back filter functions to correct a DC offset of an entire system of the actuator driver.

12. The actuator driver of claim 1, further comprising:
an error integrator configured to add to the output of the digital filter, a value obtained by integrating an error between the digital torque command signal and the digital signal fed back from the feed-back filter.

13. The actuator driver of claim 1, further comprising:
a protection detector configured to stop an output of the actuator driver upon detecting that the plurality of PWM control signals and outputs of the first and second decimation filters do not satisfy predetermined logical conditions.

14. The actuator driver of claim 1, further comprising:
first and second filters configured to integrate the outputs of the first and second continuous time ΔΣ A/D converters, respectively; and
a protection detector configured to stop an output of the actuator driver upon detecting that the plurality of PWM control signals and outputs of the first and second filters do not satisfy predetermined logical conditions.

15. The actuator driver of claim 1, further comprising:
a heat amount calculator configured to calculate an amount of heat generated in a load driven by the actuator driver based on any one of the digital torque command signal, the digital signal fed back from the feed-back filter, and the output of the digital filter, and stop an output of the actuator driver when the amount of the heat exceeds a threshold.

16. The actuator driver of claim 1, wherein the at least one H bridge includes n H bridges, and the at least one first and second terminal voltages include n first and second terminal voltages, the actuator driver further comprising:
a selector configured to selectively output any one of n digital torque command signals, which is designated by a selection signal, where n is an integer of two or more;
a first selector configured to selectively output any one of the n first terminal voltages output from the n H bridges, which is designated by the selection signal; and
a second selector configured to selectively output any one of the n second terminal voltages output from the n H bridges, which is designated by the selection signal, wherein
one of the first continuous time ΔΣ A/D converter or the second continuous time ΔΣ A/D converter converts one of the first terminal voltages output from the first selector from analog to digital in each PWM period, and outputs a digital signal,
the other one of the continuous time ΔΣ A/D converters converts one of the second terminal voltages output from the second selector from analog to digital in the PWM period, and outputs a digital signal, and
the digital PWM generator generates n groups of the plurality of PWM control signals to control the n H bridges.

17. The actuator driver of claim 1, wherein the at least one H bridge includes n H bridges, the at least one first continuous time ΔΣ A/D converter includes n first continuous time ΔΣ A/D converters, and the at least one second continuous time ΔΣ A/D converter includes n second continuous time ΔΣ A/D converters, the actuator driver further comprising:
a selector configured to selectively output any one of n digital torque command signals, which is designated by a selection signal, where n is an integer of two or more;
a first selector configured to selectively output any one of outputs of the n first continuous time ΔΣ A/D converters, which is designated by the selection signal; and
a second selector configured to selectively output any one of outputs of the n second continuous time ΔΣ A/D converters, which is designated by the selection signal, wherein the feed-back filter decimates outputs of the first and second continuous time ΔΣ A/D converters output from the first and second selectors, and
the digital PWM generator generates n groups of the plurality of PWM control signals to control the n H bridges.

* * * * *